US008188029B2

(12) United States Patent
Nekmard et al.

(10) Patent No.: US 8,188,029 B2
(45) Date of Patent: May 29, 2012

(54) HYDROPHILIC POLYURETHANE FOAM ARTICLES COMPRISING AN ANTIMICROBIAL COMPOUND

(75) Inventors: Farid Ahmad Nekmard, Old Tappan, NJ (US); Diane Joyce Burt, Montvale, NJ (US); James Chi-Cheng Feng, Fort Lee, NJ (US); Paul Hermann, Dover, NH (US)

(73) Assignee: Reckitt Benckiser LLC, Parsippany, NJ (US)

( * ) Notice: Subject to any disclaimer, the term of this patent is extended or adjusted under 35 U.S.C. 154(b) by 0 days.

(21) Appl. No.: 12/463,568

(22) Filed: May 11, 2009

(65) Prior Publication Data

US 2010/0008962 A1 Jan. 14, 2010

Related U.S. Application Data

(63) Continuation of application No. 10/547,408, filed as application No. PCT/GB2004/000843 on Mar. 1, 2004, now abandoned.

(60) Provisional application No. 60/452,150, filed on Mar. 5, 2003.

(30) Foreign Application Priority Data

Jul. 23, 2003 (GB) .................................. 0317198.0
Sep. 18, 2003 (GB) .................................. 0321869.0

(51) Int. Cl.
*C11D 3/60* (2006.01)
*C11D 1/62* (2006.01)
*C11D 1/722* (2006.01)
*C11D 3/37* (2006.01)
*C11D 17/04* (2006.01)
*C08G 18/00* (2006.01)
*C08G 18/38* (2006.01)
*B08B 7/00* (2006.01)

(52) U.S. Cl. ........ 510/438; 510/439; 510/108; 510/218; 510/235; 510/391; 510/466; 510/475; 510/504; 521/128; 521/155; 134/25.2; 134/42

(58) Field of Classification Search .................. 510/438, 510/439, 108, 218, 235, 384, 504; 134/25.2, 134/42; 521/128, 155
See application file for complete search history.

(56) References Cited

U.S. PATENT DOCUMENTS 3,098,048 A * 7/1963 Levenson et al. ............. 521/115
3,283,357 A * 11/1966 Decker et al. .............. 15/104.93
3,933,697 A * 1/1976 Fujii et al. ....................... 521/55
4,273,661 A * 6/1981 Grey ............................ 510/518
4,460,644 A * 7/1984 Pavlich ...................... 428/314.4
4,476,251 A * 10/1984 Cianciolo et al. ............. 521/110
4,654,234 A * 3/1987 Rosin et al. ................ 427/393.5
4,846,982 A * 7/1989 Madore et al. ................ 510/330
4,847,089 A * 7/1989 Kramer et al. ................ 424/415
4,941,989 A * 7/1990 Kramer et al. ................ 510/372
5,057,240 A * 10/1991 Madore et al. ................ 510/328
5,221,794 A * 6/1993 Ackerman et al. ............ 510/330
5,256,703 A * 10/1993 Hermann et al. ............. 521/120

(Continued)

*Primary Examiner* — Lorna M Douyon
(74) *Attorney, Agent, or Firm* — Norris McLaughlin & Marcus PA

(57) ABSTRACT

Foamed polyurethane articles, such as a sponges, sheets, tapes or ribbons, blocks or other molded, extruded or cast article which foamed polyurethane articles exhibit an antimicrobial benefit and are particularly useful in the formation of cleaning articles. Processes for the manufacture of such cleaning articles based on hydrophilic polyurethane foams exhibit an antimicrobial benefit and their use are also described.

14 Claims, 3 Drawing Sheets

U.S. PATENT DOCUMENTS 5,620,527 A * 4/1997 Kramer et al. .................... 134/2
5,756,439 A * 5/1998 He et al. ........................ 510/159
5,763,335 A * 6/1998 Hermann ...................... 442/370
5,976,616 A * 11/1999 Celia ............................ 427/155
6,025,287 A * 2/2000 Hermann ...................... 442/370
6,706,775 B2 * 3/2004 Hermann et al. ............. 521/134

* cited by examiner

HYDROPHILIC POLYURETHANE FOAM ARTICLES COMPRISING AN ANTIMICROBIAL COMPOUND

This application is a continuation application of U.S. Ser. No. 10/547,408 filed on Aug. 30, 2005, now abandoned, which is a 371 of PCT/GB2004/000843 filed on Mar. 1, 2004, which claims the benefit of provisional application 60/452,150 filed on Mar. 5, 2003.

The present invention relates to articles having an antimicrobial benefit. More particularly the present invention relates to hydrophilic foam articles having an antimicrobial benefit.

Cleaning articles are notoriously old to the art. Popular cleaning articles which are known include, for example sponges, wiping articles, clothes, rags, disposable paper towels, and the like. Generally, these articles may be used with or without the addition of a cleaning composition in order to locally treat a stained surface. Very often, such a cleaning composition includes one or more detersive surfactants, and optionally may contain are frequently used with cleaning articles. Such products are widely known and used. In use, a consumer sprays, pours, or otherwise applies a useful quantity of such a cleaning composition to a surface usually in the locus of a soiled or stained hard surface, and then using the cleaning article to wipe the surface and thereby remove soils or stains from the surface. Generally thereafter, the cleaning article can be reused, or may optionally be disposed of.

An inherent problem with cleaning articles which are used a number of times is that, very frequently they provide a breeding ground for undesirable bacteria and other microorganisms. Such include gram positive microorganisms as well as gram negative microorganisms. Thus, quite inadvertently, the cleaning article indeed may be an incubator for such undesired microorganisms. Generally, such cleaning articles are maintained in a moist state at a generally room temperature (approx. 20° C.) environment, such typically are also suitable conditions for maintaining the viability of such micro-organism. Worse, when left unattended for some time the growth of the undesired micro-organisms increases the amount of these microorganisms which may come into contact with both the user, and with the surface to be treated upon the next use of the cleaning article.

The prior art has proposed various methods for controlling the growth of undesired microorganisms in cleaning articles, and in particular sponges. Foam sponges are very popular and are in wide spread use, typically are based on either regenerated cellulose, or based on one or more of a variety of foamed polymers such as foamed polyurethane. Natural sponges are also notoriously old, and are widely used as cleaning articles. A more modern approach to controlling the growth of undesirable microorganism is for example described in U.S. Pat. No. 6,228,389 which describes a sponge, especially a regenerated cellulose sponge which is provided with a low aqueous soluble biocidal composition. The low aqueous solubility provides an extended antimicrobial activity to the sponge, particularly between uses. A further sponge is described in U.S. Pat. No. 6,287,584 wherein a sponge, such as a regenerated cellulose sponge is injected with a carrier mass which is sparingly water soluble, and where in such carrier mass incorporates a bias sign. The low aqueous viability of the carrier mass acts to provide a controlled release of the biocide into the interior of the sponge particularly when the sponge is maintained in a moist condition between uses. The articles described in U.S. Pat. No. 6,375,964 BI disclose foamed hydrophobic closed celled articles which include a support material as a source for the controlled release of silver ions, which silver ions provide a disinfecting effect to a treated surface. Certain hydrophilic foam sponge articles are described in U.S. Pat. No. 4,476,251 which foam is prepared by mixing together a select prepolymer reactant and water, and adding to the mixture prior to foam formation a nonionic surfactant, a quaternary ammonium compound and a silicon-based surfactant. U.S. Pat. No. 5,091,102 describes a substantially flexible dry matrix and the result and article capable of cleaning a surface by removing dust and/or organic film and rendering the surface substantially static-free, suitable for use as a garment, air filter or mat, wherein the dry matrix is uniformly coated with an amount of treatment solution sufficient to allow the matrix to retain its substantially dry characteristics, said treatment solution comprising between about 25% and 75% of at least one glycol compound, between about 0.2% and 60% of a cationic surfactant, an antimicrobial compound and optionally up to about 45% of a nonionic surfactant. U.S. Pat. No. 4,389,448 describes a flexible polyurethane foam substrate impregnated with an effective amount of a conditioning agent and which has on at least one surface thereof a pattern which is substantially totally removed from the substrate during the drying cycle thereby indicating to the consumer or user of the article that the conditioning agent has been substantially completely removed from the article during the course of the drying cycle. The contents of these patents are incorporated by reference herein.

While these provide certain technical benefits, there is nonetheless a real and continuing need in the art for further improved cleaning articles, especially flexible cleaning articles as sponges which provide a residual antimicrobial affect, particularly which is effective after a significant numbers of uses by a consumer. Accordingly, the present invention addresses this need in the art as well as addresses other needs which will become more apparent from reading the following specification.

Figure 1:
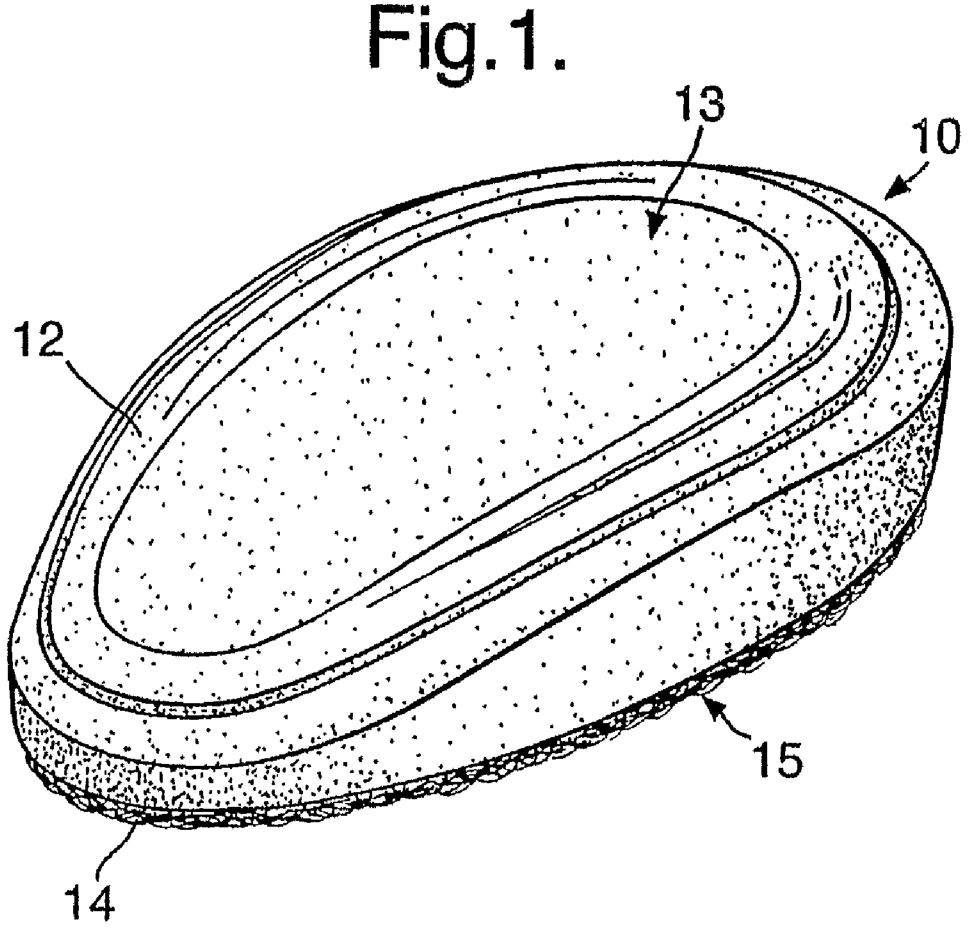
FIG. 1 depicts an embodiment of a molded cleaning article according to the invention.

In an aspect of the invention there is provided a foamed polyurethane composition which exhibits an antimicrobial benefit, which may be used to form foamed polyurethane articles, as well as cleaning articles.

In another aspect of the present invention there is provided a cleaning article comprising a foamed polyurethane composition which exhibits an antimicrobial benefit, such as a sponge, sheet, tape or ribbon, block or other molded, extruded or cast article which cleaning articles exhibit an antimicrobial benefit.

In a further aspect of the invention there is provided a cleaning article comprising a foamed polyurethane composition which exhibits an antimicrobial benefit, wherein the cleaning article comprises at least one layer of a fibrous substrate bonded to a sponge formed from the foamed polyurethane composition.

A further aspect of the invention relates to a process for the manufacture of cleaning articles, such as sponges, sheets, tapes or ribbons, blocks or other molded, extruded or cast articles which cleaning articles exhibit an antimicrobial benefit.

A yet further aspect of the invention is directed to a process for providing a residual antimicrobial benefit to a cleaning article comprising a foamed polyurethane composition.

A still further aspect of the invention relates to a process for cleaning and/or sanitizing a surface in need of treatment which process contemplates the steps of: providing a cleaning article comprising a foamed polyurethane composition, e.g., sponges, sheets, tapes, blocks or other molded, extruded or cast articles which foamed polyurethane composition exhibit an antimicrobial benefit; and, contacting the said surface with the said cleaning article so to provide a cleaning and/or sanitizing effect thereto.

In a yet further aspect of the invention there is provided a process for the cleaning and/or disinfecting treatment of hard surfaces which contemplates the use of a cleaning article as described herein, wherein said cleaning article is applied to the locus of a stain or to an area wherein the presence of an undesirable microorganism, e.g. a bacteria, or virus is suspected, and contacted said surface with the cleaning article in order to eradicate the undesirable microorganism.

These and other aspects of the invention, especially preferred aspects will become more apparent from the reading of the following specification.

The foamed polyurethane composition of the present invention is particularly adapted to be used as a cleaning article or used in the construction of a cleaning article which cleaning articles exhibit a residual antimicrobial benefit.

In one aspect, the present invention provides foamed polyurethane composition which exhibits an antimicrobial benefit. Desirably the said foamed polyurethane composition exhibits a density of at least 0.25 $g/cm^3$, preferably a density in the range of from about 0.3-0.4 $g/cm^3$, most desirably a density in the range of about 0.3-0.36 $g/cm^3$ The foamed polyurethane composition necessarily contains a sufficient amount of a quaternary ammonium compounds having germicidal properties in order to impart an antimicrobial benefit to the foamed polyurethane composition. Advantageously the said foamed polyurethane composition contains from about 0.001-10% by weight, preferably about 0.1-10% wt., more preferably about 0.3-10% wt. and most preferably about 0.5-10% wt. of at least one quaternary ammonium compound having germicidal properties generally uniformly distributed throughout. The foamed polyurethane composition may be used solely as hydrophilic foams providing an antimicrobial benefit, as well as in forming cleaning articles which may consist wholly of, or only partially of the foamed polyurethane composition which exhibits an antimicrobial benefit. The polyurethane foam compositions of the invention is hydrophilic, and is capable of absorbing water, as well as containing and releasing a quaternary ammonium compound having germicidal properties.

The foamed polyurethane composition are advantageously formed of a polyurethane prepolymer composition which is used to form a foamed article, especially a foamed article having hydrophilic properties. The selection of the polyurethane prepolymer is not critical and it is expected that any of a variety of known and commercially available polyurethane prepolymers may be used. The hydrophilic polyurethane foam compositions of the present invention are prepared using an isocyanate-capped polyether prepolymer. Isocyanate-capped polyether prepolymers such as those disclosed in U.S. Pat. No. 4,137,200 are suitable for use in the present invention. These prepolymers have a defined average isocyanate functionality greater than 2. These prepolymers may be capped with aromatic isocyanates, such as, methylene diphenyl isocyanate (MDI), or mixtures of MDI with toluene diisocyanate (TDI) and/or polymeric forms of MDI. Isocyanate-capped polyether prepolymers which have been found suitable for use in the practice of the present invention include prepolymers sold by Hampshire Chemical Company the HYPOL® trademark. Examples include HYPOL FHP 3000, HYPOL FHP 2002, HYPOL FHP 3000, HYPOL FHP 4000, HYPOL FHP 5000, HYPOL X6100, HYPOL JT 6000, and HYPOL hydrogel. The HYPOL FHP 4000 and HYPOL FHP 5000 prepolymers are derived from methylene diisocyanate. These resins possess molecular weights within the range of about 1300-1400 and have about 1.5-2.6 mEq/g of free isocyanate groups. Upon being contacted with a molar excess of water, the isocyanate groups hydrolyze to release carbon dioxide gas, thus foaming the resin without the need for added catalysts or blowing agents. The free amino groups formed by the hydrolysis reaction react with unhydrolyzed isocyanate groups to form urea groups which crosslink, with additional ioscyanurate group to form urethane and stabilize the foam, while entrapping a part of the excess water in the cell walls, where it acts to impart hydrophilic properties to the foam.

In addition to the MDI or MDI with TDI, polymeric polyisocyanate may be incorporated into the polyurethane prepolymer. The commercially available PAPI series made by Dow Chemical Company is a family of polymeric MDI produced by the reaction of carbonyl chloride with an aniline-formaldehyde condensate. The PAPI family consists of mixtures of MDI and the polymeric forms of the phenyl isocyanates that make up MDI which are linked together by methylene groups. Another example of an isocyanate-capped prepolymer preferably used in the present invention is ISO 247, a product of BASF Corporation. This prepolymer is formed from about two thirds polyether polyol and one third isocyanate. The polyol has about 75 percent by weight ethylene oxide and about 25% wt. propylene oxide with a trifunctional initiator. The isocyanate comprises a combination of methylene diphenyl diisocyanate (MDI) and other polymeric MDI. ISO 247 prepolymers have an NCO weight percent of 10.15.

The amount of polyurethane prepolymer in the reaction mixture used to prepare the hydrophilic polyurethane foam composition is not particularly critical, but depends on a number of factors, including the proportion of other components in the reactant composition as described in greater detail below. There should, however, be sufficient polyurethane prepolymer to form a polyurethane foam. The polyurethane prepolymers may be used singly or in combination.

The polyurethane prepolymer is foamed in the presence of an aqueous component, preferably water, in the conventional manner known in the art. The aqueous component may also be a water slurry or suspension, a water emulsion, or a water solution having water soluble materials disposed therein. The reaction mixture which contains at least the polyurethane prepolymer, and a quaternary ammonium compound having germicidal properties. The reaction mixture typically contains further constituents which take part in reaction whereby the polyurethane foams which exhibit an antimicrobial benefit are formed. During the reaction wherein the polyurethane foam is formed, the amount of water present in the reaction mixture reacts with the free isocyanate groups to release carbon dioxide, which blows the polyurethane prepolymer into a cross-linked, open-celled foam which is rendered hydrophilic by the integral entrapment of excess water in the cell walls of the foam matrix. When the reaction mixture is allowed to set in molds, a flexible, resilient foam body of the desired shape is formed. Alternately the reaction mixture may be applied to a substrate such as sheet, plate, film but especially a silicone coated release sheet and allowed to set, which may provide a flexible resilient foam body in a generally planar or sheet form. The reaction mixture, and the foamed polyurethane compositions ultimately formed therefrom also necessarily include as one or morequaternary ammonium compounds having germicidal properties. Desirably the one or morequaternary ammonium compounds having germicidal properties are provided to provide a long term antimicrobial benefit to the foamed polyurethane composition and particularly to cleaning articles formed therefrom or therewith. Per se, many quaternary ammonium compounds are known and are contemplated as being useful in the present inventive compositions. Such quaternary ammonium compound having germicidal properties are well known, and many of these are categorized as cationic surfactants including those described for example in *McCutcheon's Functional Materials, Vol.* 2, 1998; *Kirk-Othmer, Encyclopedia of Chemical Technology,* 4th Ed., Vol. 23, pp. 481-541 (1997), the contents of which are herein incorporated by reference. Useful quaternary ammonium compounds having germicidal properties are also described in the respective product specifications and literature available from the suppliers of these cationic surfactants.

Examples of preferred cationic surfactant compositions useful in the practice of the instant invention are those which provide a germicidal effect to the foamed polyurethane composition, and especially preferred are quaternary ammonium compounds and salts thereof, which may be characterized by the general structural formula:

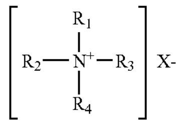

where at least one of $R_1$, $R_2$, $R_3$ and $R_4$ is a alkyl, aryl or alkylaryl substituent of from 6 to 26 carbon atoms, and the entire cation portion of the molecule has a molecular weight of at least 165. The alkyl substituents may be long-chain alkyl, long-chain alkoxyaryl, long-chain alkylaryl, halogen-substituted long-chain alkylaryl, long-chain alkylphenoxyalkyl, arylalkyl, etc. The remaining substituents on the nitrogen atoms other than the abovementioned alkyl substituents are hydrocarbons usually containing no more than 12 carbon atoms. The substituents $R_1$, $R_2$, $R_3$ and $R_4$ may be straight-chained or may be branched, but are preferably straight-chained, and may include one or more amide, ether or ester linkages. The counterion X may be any salt-forming anion which permits water solubility of the quaternary ammonium complex.

Exemplary quaternary ammonium salts within the above description include the alkyl ammonium halides such as cetyl trimethyl ammonium bromide, alkyl aryl ammonium halides such as octadecyl dimethyl benzyl ammonium bromide, N-alkyl pyridinium halides such as N-cetyl pyridinium bromide, and the like. Other suitable types of quaternary ammonium salts include those in which the molecule contains either amide, ether or ester linkages such as octyl phenoxy ethoxy ethyl dimethyl benzyl ammonium chloride, N-(laurylcocoaminoformylmethyl)-pyridinium chloride, and the like. Other very effective types of quaternary ammonium compounds which are useful as germicides include those in which the hydrophobic radical is characterized by a substituted aromatic nucleus as in the case of lauryloxyphenyltrimethyl ammonium chloride, cetylaminophenyltrimethyl ammonium methosulfate, dodecylphenyltrimethyl ammonium methosulfate, dodecylbenzyltrimethyl ammonium chloride, chlorinated dodecylbenzyltrimethyl ammonium chloride, and the like.

Preferred quaternary ammonium compounds which act as germicides and which are found useful in the foamed polyurethane composition include those which have the structural formula:

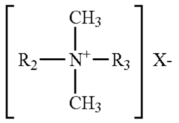

wherein $R_2$ and $R_3$ are the same or different $C_8$-$C_{12}$alkyl, or $R_2$ is $C_{12-16}$alkyl, $C_{8-18}$alkylethoxy, $C_{8-18}$alkylphenolethoxy and $R_3$ is benzyl, and X is a halide, for example chloride, bromide or iodide, or is a methosulfate anion. The alkyl groups recited in $R_2$ and $R_3$ may be straight-chained or branched, but are preferably substantially linear.

Particularly useful quaternary germicides include compositions which include a single quaternary compound, as well as mixtures of two or more different quaternary compounds. Such useful quaternary compounds are available under the BARDAC®, BARQUAT®, HYAMINE®, LONZABAC®, and ONYXIDE® trademarks, which are more fully described in, for example, *McCutcheon's Functional Materials* (Vol. 2), North American Edition, 1998, as well as the respective product literature from the suppliers identified below. For example, BARDAC® 205M is described to be a liquid containing alkyl dimethyl benzyl ammonium chloride, octyl decyl dimethyl ammonium chloride; didecyl dimethyl ammonium chloride, and dioctyl dimethyl ammonium chloride (50% active) (also available as 80% active (BARDAC® 208M)); described generally in McCutcheon's as a combination of alkyl dimethyl benzyl ammonium chloride and dialkyl dimethyl ammonium chloride); BARDAC® 2050 is described to be a combination of octyl decyl dimethyl ammonium chloride/didecyl dimethyl ammonium chloride, and dioctyl dimethyl ammonium chloride (50% active) (also available as 80% active (BARDAC® 2080)); BARDAC® 2250 is described to be didecyl dimethyl ammonium chloride (50% active); BARDAC® LF (or BARDAC® LF-80), described as being based on dioctyl dimethyl ammonium chloride (BARQUAT® MB-50, MX-50, OJ-50 (each 50% liquid) and MB-80 or MX-80 (each 80% liquid) are each described as an alkyl dimethyl benzyl ammonium chloride; BARDAC® 4250 and BARQUAT® 4250Z (each 50% active) or BARQUAT® 4280 and BARQUAT 4280Z (each 80% active) are each described as alkyl dimethyl benzyl ammonium chloride/alkyl dimethyl ethyl benzyl ammonium chloride. Also, HYAMINE® 1622, described as diisobutyl phenoxy ethoxy ethyl dimethyl benzyl ammonium chloride (50% solution); HYAMINE® 3500 (50% actives), described as alkyl dimethyl benzyl ammonium chloride (also available as 80% active (HYAMINE®13500-80)); and HYAMINE®12389 described as being based on methyldodecylbenzyl ammonium chloride and/or methyldodecylxylene-bis-trimethyl ammonium chloride. (BARDAC®, BARQUAT® and HYAMINE® are presently commercially available from Lonza, Inc., Fairlawn, N.J.). BTC® 50 NF (or BTC® 65 NF) is described to be alkyl dimethyl benzyl ammonium chloride (50% active); BTC® 99 is described as didecyl dimethyl ammonium chloride (50% active); BTC® 776 is described to be myrisalkonium chloride (50% active);

BTC® 818 is described as being octyl decyl dimethyl ammonium chloride, didecyl dimethyl ammonium chloride, and dioctyl dimethyl ammonium chloride (50% active) (available also as 80% active (BTC® 818-80%)); BTC® 824 and BTC® 835 are each described as being of alkyl dimethyl benzyl ammonium chloride (each 50% active); BTC® 885 is described as a combination of BTC® 835 and BTC® 818 (50% active) (available also as 80% active (BTC® 888)); BTC® 1010 is described as didecyl dimethyl ammonium chloride (50% active) (also available as 80% active (BTC® 1010-80)); BTC® 2125 (or BTC® 2125 M) is described as alkyl dimethyl benzyl ammonium chloride and alkyl dimethyl ethylbenzyl ammonium chloride (each 50% active) (also available as 80% active (BTC® 12125 80 or BTC® 2125 M)); BTC® 2565 is described as alkyl dimethyl benzyl ammonium chlorides (50% active) (also available as 80% active (BTC® 2568)); BTC® 8248 (or BTC® 8358) is described as alkyl dimethyl benzyl ammonium chloride (80% active) (also available as 90% active (BTC® 8249)); ONYXIDE® 3300 is described as n-alkyl dimethyl benzyl ammonium saccharinate (95% active). (BTC® and ONYXIDE® are presently commercially available from Stepan Company, Northfield, Ill.) Polymeric quaternary ammonium salts based on these monomeric structures are also considered desirable for the present invention. One example is POLYQUAT®, described as being a 2-butenyldimethyl ammonium chloride polymer.

The inventors have observed that not all quaternary ammonium compounds having germicidal properties necessarily provide for the optimal foaming of the polyurethane prepolymer and resultant foamed polyurethane composition which exhibits good resilience, good flexibility and good product integrity, and for these reasons certain quaternary ammonium compounds are presently preferred over others. For example, such preferred quaternary ammonium compounds include those selected from the following: BTC® 65, BTC® 2125M90, BTC® 8358, CATIGENE® T50, and HYAMINE® 1622. BTC® 65 is a commercially available preparation which is described to contain in 50% wt. of a $C_{12}$-$C_{16}$ alkyl dimethyl benzyl ammonium chloride provided in an aqueous alcoholic carrier wherein water comprises 46% wt. of the commercial preparation, and ethanol comprises the remaining 4% wt. of the commercial preparation. BTC® 2125M90 is a commercial available preparation which is described to contain 45% wt. of a $C_{12}$-$C_{16}$ dimethyl benzyl ammonium chloride, 45% wt. of a $C_{12}$-$C_{18}$ alkyldimethyl (ethylbenzyl) ammonium chloride, 4% wt. water, 3% wt. ethanol, and the remaining balance of 3% wt. comprising $C_{12}$-$C_{18}$ alkylmethylamines. BTC® 8358 is a commercially available preparation which is described to contain 80% wt. of a $C_{12}$-$C_{16}$ alkyl dimethyl benzyl ammonium chloride, 17% wt. of ethanol, 2% wt. water, and 1% wt. of $C_{12}$-$C_{16}$ alkyldimethyl amines. CATIGENE® T50 is a commercially available preparation containing 50% wt. of a $C_8$-$C_{18}$ alkyl dimethyl benzalkonium ammonium chloride and 50% wt. water. HYAMINE® 1622 Crystal is a commercially available anhydrous preparation which is described to contain 100% wt. of diisobuylphenoxyethoxyethyl dimethyl benzyl ammonium chloride. As is evident from the above, the concentration of the active quaternary ammonium compounds in each one of these commercial compositions varies, and the composition of the aqueous/alcoholic solution varies as well.

While not wishing to be bound by the following, one of more of the following factors may contribute to the advantages of the preferred quaternary ammonium compounds over others. One possible factor is that the preferred quaternary ammonium compounds are provided in commercial preparations which may contain non-quaternized alkyldimethylamines in appreciable amounts. Another possible factor is that the preferred quaternary ammonium compounds provided in commercial preparations contain at least one benzyl moiety within the structure of the quaternary ammonium compounds providing the germicidal properties.

According to certain particularly preferred embodiments, the preferred quaternary ammonium compounds are the sole constituents which provide a germicidal effect to the formed articles.

Most preferably the inventive articles and compositions for their production exclude sources of silver ions such as disclosed in U.S. Pat. No. 6,375,964 the contents of which are herein incorporated by reference.

It will be appreciated that further constituents may optionally be added to the reaction mixture in order to ultimately impart desired properties to the foamed polyurethane composition and/or to cleaning articles comprising the foamed polyurethane composition. If desired, the reaction mixture may contain fillers, stabilizers, additives such as reinforcing agents, auxiliary blowing agents, fragrances, deodorizers, colorants, one or more detersive surfactants, silicone oils, rubbers, abrasive powders and the like. Preferably, all such fillers, stabilizers, additives and the like will be substantially nonreactive with the isocyanate and hydroxy groups under the conditions of foam formulation.

An optional, but frequently desirable constituent is one or more detersive surfactants. Preferably, the detersive surfactants are selected from one or more of: nonionic, cationic, zwitterionic, and amphoteric surfactants. These surfactants are, per se, generally known to the art.

Generally any nonionic surfactant material may be used in the inventive compositions. Practically any hydrophobic compound having a carboxy, hydroxy, amido, or amino group with a free hydrogen attached to the nitrogen can be condensed with an alkylene oxide, especially ethylene oxide or with the polyhydration product thereof, a polyalkylene glycol, especially polyethylene glycol, to form a water soluble or water dispersible nonionic surfactant compound. By way of non-limiting example, particularly examples of suitable nonionic surfactants which may be used in the present invention include the following:

One class of useful nonionic surfactants include polyalkylene oxide condensates of alkyl phenols. These compounds include the condensation products of alkyl phenols having an alkyl group containing from about 6 to 12 carbon atoms in either a straight chain or branched chain configuration with an alkylene oxide, especially an ethylene oxide, the ethylene oxide being present in an amount equal to 5 to 25 moles of ethylene oxide per mole of alkyl phenol. The alkyl substituent in such compounds can be derived, for example, from polymerized propylene, diisobutylene and the like. Examples of compounds of this type include nonyl phenol condensed with about 9.5 moles of ethylene oxide per mole of nonyl phenol; dodecylphenol condensed with about 12 moles of ethylene oxide per mole of phenol; dinonyl phenol condensed with about 15 moles of ethylene oxide per mole of phenol and diisooctyl phenol condensed with about 15 moles of ethylene oxide per mole of phenol.

A further class of useful nonionic surfactants include the condensation products of aliphatic alcohols with from about 1 to about 60 moles of an alkylene oxide, especially an ethylene oxide. The alkyl chain of the aliphatic alcohol can either be straight or branched, primary or secondary, and generally contains from about 8 to about 22 carbon atoms. Examples of such ethoxylated alcohols include the condensation product of myristyl alcohol condensed with about 10 moles of ethylene oxide per mole of alcohol and the condensation product of about 9 moles of ethylene oxide with coconut alcohol (a mixture of fatty alcohols with alkyl chains varying in length from about 10 to 14 carbon atoms). Other examples are those $C_6$-$C_{11}$ straight-chain alcohols which are ethoxylated with from about 3 to about 6 moles of ethylene oxide. Their derivation is well known in the art. Examples include Alfonic® 810-4.5, which is described in product literature from Sasol as a C8-10 having an average molecular weight of 356, an ethylene oxide content of about 4.85 moles (about 60 wt. %), and an HLB of about 12; Alfonic® 810-2, which is described in product literature as a C8-C10 having an average molecular weight of 242, an ethylene oxide content of about 2.1 moles (about 40 wt. %), and an HLB of about 12; and Alfonic® 610-3.5, which is described in product literature as having an average molecular weight of 276, an ethylene oxide content of about 3.1 moles (about 50 wt. %), and an HLB of 10. Other examples of alcohol ethoxylates are C10 oxo-alcohol ethoxylates available from BASF under the Lutensol® ON tradename. They are available in grades containing from about 3 to about 11 moles of ethylene oxide (available under the names Lutensol® ON 30; Lutensol® ON 50; Lutensol® ON 60; Lutensol® ON 65; Lutensol® ON 66; Lutensol® ON 70; Lutensol® ON 80; and Lutensol®ON 110). Other examples of ethoxylated alcohols include the Neodol® 91 series non-ionic surfactants available from Shell Chemical Company which are described as $C_9$-$C_{11}$ ethoxylated alcohols. The Neodol® 91 series non-ionic surfactants of interest include Neodol® 91-2.5, Neodol® 91-6, and Neodol® 91-8. Neodol® 91-2.5 has been described as having about 2.5 ethoxy groups per molecule; Neodol 91-6 has been described as having about 6 ethoxy groups per molecule; and Neodol 91-8 has been described as having about 8 ethoxy groups per molecule. Further examples of ethoxylated alcohols include the Rhodasurf® DA series non-ionic surfactants available from Rhodia which are described to be branched isodecyl alcohol ethoxylates. Rhodasurf® DA-530 has been described as having 4 moles of ethoxylation and an HLB of 10.5; Rhodasurf® DA-630 has been described as having 6 moles of ethoxylation with an HLB of 12.5; and Rhodasurf® DA-639 is a 90% solution of DA-630. Further examples of ethoxylated alcohols include those from Tomah Products (Milton, Wis.) under the Tomadol® tradename with the formula $RO(CH_2CH_2O)_nH$ where R is the primary linear alcohol and n is the total number of moles of ethylene oxide. The ethoxylated alcohol series from Tomah include 91-2.5; 91-6; 91-8—where R is linear $C_9/C_{10}/C_{11}$ and n is 2.5, 6, or 8; 1-3; 1-5; 1-7; 1-73B; 1-9; where R is linear $C_{11}$ and n is 3, 5, 7 or 9; 23-1; 23-3; 23-5; 23-6.5—where R is linear $C_{12}/C_{13}$ and n is 1, 3, 5, or 6.5; 25-3; 25-7; 25-9; 25-12—where R is linear $C_{12}/C_{13}/C_{14}/C_{15}$ and n is 3, 7, 9, or 12; and 45-7; 45-13—where R is linear $C_{14}/C_{15}$ and n is 7 or 13.

A further class of useful nonionic surfactants include primary and secondary linear and branched alcohol ethoxylates, such as those based on $C_6$-$C_{18}$ alcohols which further include an average of from 2 to 80 moles of ethoxylation per mol of alcohol. These examples include the Genapol® UD (ex. Clariant, Muttenz, Switzerland) described under the tradenames Genapol® UD 030, $C_{11}$-oxo-alcohol polyglycol ether with 3 EO; Genapol® UD, 050 $C_{11}$-oxo-alcohol polyglycol ether with 5 EO; Genapol® UD 070, $C_{11}$-oxo-alcohol polyglycol ether with 7 EO; Genapol® UD 080, $C_{11}$-oxo-alcohol polyglycol ether with 8 EO; Genapol® UD 088, $C_{11}$-oxo-alcohol polyglycol ether with 8 EO; and Genapol® UD 110, $C_{11}$-oxo-alcohol polyglycol ether with 11 EO.

A further class of useful nonionic surfactants include those surfactants having a formula $RO(CH_2CH_2O)_nH$ wherein R is a mixture of linear, even carbon-number hydrocarbon chains ranging from $C_{12}H_{25}$ to $C_{16}H_{33}$ and n represents the number of repeating units and is a number of from about 1 to about 12. Surfactants of this formula are presently marketed under the Genapol® tradename (ex. Clariant), which surfactants include the "26-L" series of the general formula $RO(CH_2CH_2O)_nH$ wherein R is a mixture of linear, even carbon-number hydrocarbon chains ranging from $C_{12}H_{25}$ to $C_{16}H_{33}$ and n represents the number of repeating units and is a number of from 1 to about 12, such as 26-L-1,26-L-1.6, 26-L-2,26-L-3,26-L-5,26-L-45, 26-L-50, 26-L-60, 26-L-60N, 26-L-75, 26-L-80, 26-L-98N, and the 24-L series, derived from synthetic sources and typically contain about 55% $C_{12}$ and 45% $C_{14}$ alcohols, such as 24-L-3,24-L-45, 24-L-50, 24-L-60, 24-L-60N, 24-L-75, 24-L-92, and 24-L-98N, all sold under the Genapol® tradename.

A further class of useful nonionic surfactants include alkoxy block copolymers, and in particular, compounds based on ethoxy/propoxy block copolymers. Polymeric alkylene oxide block copolymers include nonionic surfactants in which the major portion of the molecule is made up of block polymeric $C_2$-$C_4$ alkylene oxides. Such nonionic surfactants, while preferably built up from an alkylene oxide chain starting group, and can have as a starting nucleus almost any active hydrogen containing group including, without limitation, amides, phenols, thiols and secondary alcohols.

One group of such useful nonionic surfactants containing the characteristic alkylene oxide blocks are those which may be generally represented by the formula (A):

$$R\text{-}(EO)_x(PO)_y(EO)_z\text{—}H \qquad (A)$$

where

R represents a hydroxyl group or an alkyl group,

EO represents ethylene oxide,

PO represents propylene oxide, y equals at least 15, $(EO)_{x+z}$ equals 20 to 80% of the total weight of said compounds, and, the total molecular weight is preferably in the range of about 2000 to 15,000. These surfactants are available under the PLURONIC® (ex. BASF) wherein R is —OH, or when R is an alkyl group, EMULGEN® (ex. Kao.)

A further group of such useful nonionic surfactants containing the characteristic alkylene oxide blocks are those can be represented by the formula (B):

$$R\text{-}(EO,PO)_a(EO,PO)_b\text{—}H \qquad (B)$$

wherein R is an alkyl, aryl or aralkyl group, where the R group contains 1 to 20 carbon atoms, the weight percent of EO is within the range of 0 to 45% in one of the blocks a, b, and within the range of 60 to 100% in the other of the blocks a, b, and the total number of moles of combined EO and PO is in the range of 6 to 125 moles, with 1 to 50 moles in the PO rich block and 5 to 100 moles in the EO rich block. Specific nonionic surfactants which in general are encompassed by Formula B include butoxy derivatives of propylene oxide/ethylene oxide block polymers having molecular weights within the range of about 2000-5000.

Still further examples of useful nonionic surfactants include those which can be represented by formula (C) as follows:

$$RO\text{—}(BO)_n(EO)_x\text{—}H \qquad (C)$$

wherein

EO represents ethylene oxide,

BO represents butylene oxide,

R is an alkyl group containing 1 to 20 carbon atoms, n is about 5-15 and x is about 5-15.

Yet further useful nonionic surfactants include those which may be represented by the following formula (D):

$$HO\text{-}(EO)_x(BO)_n(EO)_y\text{—}H \qquad (D)$$

wherein

EO represents ethylene oxide,

BO represents butylene oxide, n is about 5-15, preferably about 15, x is about 5-15, preferably about 15, and y is about 5-15, preferably about 15.

Still further exemplary useful nonionic block copolymer surfactants include ethoxylated derivatives of propoxylated ethylene diamine, which may be represented by the following formula:

(E)

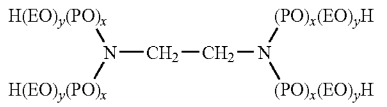

where (EO) represents ethoxy, (PO) represents propoxy, the amount of $(PO)_x$ is such as to provide a molecular weight prior to ethoxylation of about 300 to 7500, and the amount of $(EO)_y$ is such as to provide about 20% to 90% of the total weight of said compound.

Particularly preferred for use as nonionic surfactants include those presently marketed under the trade name Pluronic® (ex. BASF). The compounds are formed by condensing ethylene oxide with a hydrophobic base formed by the condensation of propylene oxide with propylene glycol, and are described by their manufacturer to have the following general structure:

(F)

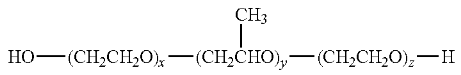

wherein x, y and z are selected such that the molecular weight of the block polymers varies from at least about 7,000 to about 15,000 preferably about 11,000 to about 15,000 and the polyethylene oxide content may comprise 5% to 90% by weight of the block polymer. Preferably, these surfactants are in liquid form and particularly satisfactory surfactants are available as those marketed as Pluronic® F88 described to have a molecular weight of about 11400, Pluronic® F98 described to have a molecular weight of about 13000, Pluronic® F108 described to have a molecular weight of about 14600, and Pluronic® F127 described to have a molecular weight of about 12600.

In certain preferred embodiments there is at least one nonionic surfactant present which nonionic surfactant is based on ethoxy/propoxy units; according to certain especially preferred embodiments the sole nonionic surfactant present is a nonionic block copolymer as described above within the Pluronic® series of surfactants, especially the nonionic surfactant described as Pluronic® F88.

Alkylmonoglyocosides and alkylpolyglycosides which may also find use in the present inventive compositions include known nonionic surfactants which are alkaline and electrolyte stable. Alkylmonoglycosides and alkylpolyglycosides are prepared generally by reacting a monosaccharide, or a compound hydrolyzable to a monosaccharide with an alcohol such as a fatty alcohol in an acid medium. Various glycoside and polyglycoside compounds including alkoxylated glycosides and processes for making them are disclosed in U.S. Pat. Nos. 2,974,134; 3,219,656; 3,598,865; 3,640,998; 3,707,535, 3,772,269; 3,839,318; 3,974,138; 4,223,129 and 4,528,106 the contents of which are incorporated by reference.

One exemplary group of such useful alkylpolyglycosides include those according to the formula:

$$R_2O\text{—}(C_nH_{2n}O)_r\text{—}(Z)_x$$

wherein:

$R_2$ is a hydrophobic group selected from alkyl groups, alkylphenyl groups, hydroxyalkylphenyl groups as well as mixtures thereof, wherein the alkyl groups may be straight chained or branched, and which contain from about 8 to about 18 carbon atoms, n has a value of 2-8, especially a value of 2 or 3;

r is an integer from 0 to 10, but is preferably 0,

Z is derived from glucose; and, x is a value from about 1 to 8, preferably from about 1.5 to 5.

Preferably the alkylpolyglycosides are nonionic fatty alkylpolyglucosides which contain a straight chain or branched chain $C_8$-$C_{15}$ alkyl group, and have an average of from about 1 to 5 glucose units per fatty alkylpolyglucoside molecule. More preferably, the nonionic fatty alkylpolyglucosides which contain straight chain or branched $C_8$-$C_{15}$ alkyl group, and have an average of from about 1 to about 2 glucose units per fatty alkylpolyglucoside molecule.

A further exemplary group of alkyl glycoside surfactants suitable for use in the practice of this invention may be presented by the following formula (A):

$$RO\text{—}(R_1O)_y\text{-}(G)_xZ_b \qquad (A)$$

wherein:

R is a monovalent organic radical containing from about 6 to about 30, preferably from about 8 to 18 carbon atoms, $R_1$ is a divalent hydrocarbon radical containing from about 2 to about 4 carbon atoms, y is a number which has an average value from about 0 to about 1 and is preferably 0, G is a moiety derived from a reducing saccharide containing 5 or 6 carbon atoms; and, x is a number having an average value from about 1 to 5 (preferably from 1.1 to 2);

Z is $O_2M^1$,

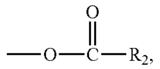

$O(CH_2)$, $CO_2M^1$, $OSO_3M^1$, or $O(CH_2)SO_3M^1$; $R_2$ is $(CH_2)$ $CO_2$ $M^1$ or $CH{=}CHCO_2M^1$; (with the proviso that Z can be $O_2M^1$ only if Z is in place of a primary hydroxyl group in which the primary hydroxyl-bearing carbon atom, —$CH_2OH$, is oxidized to form a

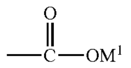
group)

b is a number of from 0 to 3x+1 preferably an average of from 0.5 to 2 per glycosal group; p is 1 to 10, $M^1$ is $H^+$ or an organic or inorganic counterion, particularly cations such as, for example, an alkali metal cation, ammonium cation, monoethanolamine cation or calcium cation. As defined in Formula (A) above, R is generally the residue of a fatty alcohol having from about 8 to 30 and preferably 8 to 18 carbon atoms.

Examples of such alkylglycosides as described above include, for example APG 325 CS Glycoside® which is described as being a 50% $C_9$-$C_{11}$ alkyl polyglycoside, also commonly referred to as D-glucopyranoside, (commercially available from Henkel KGaA) and Glucopon® 625 CS which is described as being a 50% $C_{10}$-$C_{16}$ alkyl polyglycoside, also commonly referred to as a D-glucopyranoside, (ex. Henkel).

Further nonionic surfactants which may be included in the inventive compositions include alkoxylated alkanolamides, preferably $C_8$-$C_{24}$ alkyl di(C2-C3 alkanol amides), as represented by the following formula:

$$R_5—CO—NH—R_6—OH$$

wherein $R_5$ is a branched or straight chain $C_8$-$C_{24}$ alkyl radical, preferably a $C_{10}$-$C_{16}$ alkyl radical and more preferably a $C_{12}$-$C_{14}$ alkyl radical, and $R_6$ is a $C_1$-$C_4$ alkyl radical, preferably an ethyl radical.

The inventive compositions may also include a nonionic amine oxide constituent. Exemplary amine oxides include:

(A) Alkyl di(lower alkyl) amine oxides in which the alkyl group has about 10-20, and preferably 12-16 carbon atoms, and can be straight or branched chain, saturated or unsaturated. The lower alkyl groups include between 1 and 7 carbon atoms. Examples include lauryl dimethyl amine oxide, myristyl dimethyl amine oxide, and those in which the alkyl group is a mixture of different amine oxide, dimethyl cocoamine oxide, dimethyl(hydrogenated tallow)amine oxide, and myristyl/palmityl dimethyl amine oxide;

(B) Alkyl di(hydroxy lower alkyl)amine oxides in which the alkyl group has about 10-20, and preferably 12-16 carbon atoms, and can be straight or branched chain, saturated or unsaturated. Examples are bis(2-hydroxyethyl) cocoamine oxide, bis(2-hydroxyethyl) tallowamine oxide; and bis(2-hydroxyethyl) stearylamine oxide;

(C) Alkylamidopropyl di(lower alkyl) amine oxides in which the alkyl group has about 10-20, and preferably 12-16 carbon atoms, and can be straight or branched chain, saturated or unsaturated. Examples are cocoamidopropyl dimethyl amine oxide and tallowamidopropyl dimethyl amine oxide; and (D) Alkylmorpholine oxides in which the alkyl group has about 10-20, and preferably 12-16 carbon atoms, and can be straight or branched chain, saturated or unsaturated.

Preferably the amine oxide constituent is an alkyl di(lower alkyl) amine oxide as denoted above and which may be represented by the following structure:

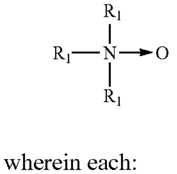

wherein each:

$R_1$ is a straight chained $C_1$-$C_4$ alkyl group, preferably both $R_1$ are methyl groups; and, $R_2$ is a straight chained $C_8$-$C_{18}$ alkyl group, preferably is $C_{10}$-$C_{14}$ alkyl group, most preferably is a $C_{12}$ alkyl group. Each of the alkyl groups may be linear or branched, but most preferably are linear. Most preferably the amine oxide constituent is lauryl dimethyl amine oxide. Technical grade mixtures of two or more amine oxides may be used, wherein amine oxides of varying chains of the $R_2$ group are present. Preferably, the amine oxides used in the present invention include $R_2$ groups which comprise at least 50% wt., preferably at least 60% wt. of $C_{12}$ alkyl groups and at least 25% wt. of $C_{14}$ alkyl groups, with not more than 15% wt. of $C_{16}$, $C_{18}$ or higher alkyl groups as the $R_2$ group.

Of course the nonionic surfactant constituent, when present, may comprise two or more nonionic surfactants. When present, the nonionic surfactant is present in the compositions of the present invention in an amount of from about 0.1% to about 10% by weight, more preferably is present in an amount of from about 1-5% wt., and most preferably in an amount of from about 1-3.5% wt.

Although optional, the compositions according to the present invention may include one or more further detersive surfactants particularly those selected from amongst amphoteric and zwitterionic surfactants, particularly those which may provide a detersive effect to the compositions. By way of non-limiting example, zwitterionic surfactants and amphoteric surfactants may include one or more of the following.

For example the compositions according to the invention may optionally further comprise an alkyl ethoxylated carboxylate surfactant. In particular, the alkyl ethoxylated carboxylate comprises compounds and mixtures of compounds which may be represented by the formula:

$$R_1(OC_2H_4)_n—OCH_2COO^-M^+$$

wherein $R_1$ is a $C_4$-$C_{18}$ alkyl, n is from about 3 to about 20, and M is hydrogen, a solubilizing metal, preferably an alkali metal such as sodium or potassium, or ammonium or lower alkanolammonium, such as triethanolammonium, monoethanolammonium, or diisopropanolammonium. The lower alkanol of such alkanolammonium will normally be of 2 to 4 carbon atoms and is preferably ethanol. Preferably, $R_1$ is a $C_{12}$-$C_{15}$ alkyl, n is from about 7 to about 13, and M is an alkali metal counterion.

Examples of alkyl ethoxylated carboxylates contemplated to be useful in the present invention include, but are not necessarily limited to, sodium buteth-3 carboxylate, sodium hexeth-4 carboxylate, sodium laureth-5 carboxylate, sodium laureth-6 carboxylate, sodium laureth-8 carboxylate, sodium laureth-11 carboxylate, sodium laureth-13 carboxylate, sodium trideceth-3 carboxylate, sodium trideceth-6 carboxylate, sodium trideceth-7 carboxylate, sodium trideceth-19 carboxylate, sodium capryleth-4 carboxylate, sodium capryleth-6 carboxylate, sodium capryleth-9 carboxylate, sodium capryleth-13 carboxylate, sodium ceteth-13 carboxylate, sodium $C_{12-15}$ pareth-6 carboxylate, sodium $C_{12-15}$ pareth-7 carboxylate, sodium $C_{14-15}$ pareth-8 carboxylate, isosteareth-6 carboxylate as well as the acid form. Sodium laureth-8 carboxylate, sodium laureth-13 carboxylate, pareth-25-7 carboxylic acid are preferred. A particularly preferred sodium laureth-13 carboxylate can be obtained from Finetex Inc. under the trade name Surfine® WLL or from Clariant Corp. under the trade name Sandopan® LS-24.

By way of non-limiting example exemplary amphoteric surfactants include one or more water-soluble betaine surfactants which may be represented by the general formula:

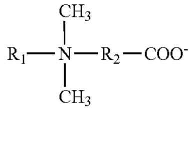

wherein: $R_1$ is an alkyl group containing from 8 to 18 carbon atoms, or the amido radical which may be represented by the following general formula:

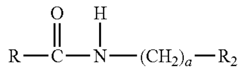

wherein R is an alkyl group having from 8 to 18 carbon atoms, a is an integer having a value of from 1 to 4 inclusive, and $R_2$ is a $C_1$-$C_4$ alkylene group. Examples of such water-soluble betaine surfactants include dodecyl dimethyl betaine, as well as cocoamidopropylbetaine.

When present, any amphoteric and/or zwitterionic surfactants present in the compositions of the present invention are desirably included in an amount of from about 0.1 to about 10% by weight.

Most desirably, the total amount of optional detersive surfactants present in the inventive compositions does not exceed about 10% wt., more preferably does not exceed about 5% wt. of the total weight of the inventive composition. When present, the detersive surfactants may be used singly, or in mixtures of two or more surfactants.

A further constituent which is optionally, but in certain cases desirably included in the foamed polyurethane compositions of the invention are one or more organic solvents which provides both a solvency function, as well as an anti-foaming function. By way of non limited example, such solvents can be virtually any organic solvent material. By way of non-limiting example exemplary useful organic solvents which may be included in the inventive compositions include those which are at least partially water-miscible such as alcohols (e.g., low molecular weight alcohols, such as, for example, ethanol, propanol, isopropanol, and the like), glycols (such as, for example, ethylene glycol, propylene glycol, hexylene glycol, and the like), water-miscible ethers (e.g. diethylene glycol diethylether, diethylene glycol dimethylether, propylene glycol dimethylether), water-miscible glycol ether (e.g. propylene glycol monomethylether, propylene glycol mono ethylether, propylene glycol monopropylether, propylene glycol monobutylether, ethylene glycol monobutylether, dipropylene glycol monomethylether, diethyleneglycol monobutylether), lower esters of monoalkylethers of ethylene glycol or propylene glycol (e.g. propylene glycol monomethyl ether acetate), and mixtures thereof. Glycol ethers having the general structure $R_a$—$R_b$—OH, wherein $R_a$ is an alkoxy of 1 to 20 carbon atoms, or aryloxy of at least 6 carbon atoms, and $R_b$ is an ether condensate of propylene glycol and/or ethylene glycol having from one to ten glycol monomer units. Of course, mixtures of two or more organic solvents may be used in the organic solvent constituent. Desirably, when present the organic solvent is selected to aid in the miscibility of one or more of the further constituents used to make the foamed polyurethane composition, and at the same time impart at least a minimal anti-foaming effect. This latter effect is often desired as during the in-situ formation of the foamed polyurethane composition a limited or controlled degree of foaming is achieved. Excess or turbulent foaming is usually to be avoided as it typically degrades the ultimate structural integrity of foamed polyurethane composition as well as cleaning articles formed therefrom. Uncontrolled foaming may result in the uneven, or poor distribution of gas bubbles within the foamed polyurethane composition which in turn, deleteriously affects the structural integrity of the foamed polyurethane composition as well as any cleaning article formed thereform. Preferred organic solvents are glycol ethers, of which a particularly preferred glycol ether solvent is dipropylene glycol n-butyl ether which is commercially available, i.e. as Dowanol DPnB (Ex. Dow Chemical).

As a further organic solvent, the reaction mixture may include a minor amount of a low boiling point alcohol such as one $C_1$-$C_4$ monohydric alcohols, such as methanol, ethanol or propanol. Of these, the use of methanol is particularly preferred. $C_1$-$C_4$ monohydric alcohols reduce the rate of reaction between the isocyanate-capped prepolymer and water present in the reaction mixture. A reduction of the reaction rate, viz., in the polymerization and formation of the polyurethane foam is frequently desirable in order to facilitate mixing of the various constituents used to produce the polyurethane foams, and to permit for subsequent handling of the reaction mixture such as into a mold, cavity or spreading it into a layer of suitable thickness for curing. Monohydric alcohols serves to end cap some of the NCO end groups, preventing reaction with water to form the urea linkage. Such also provides a more flexible polyuretheane foam composition. Generally good results are observed when about one part by weight of the isocyanate-capped prepolymer is mixed with water in the presence of from 0.05 to 0.25 parts by weight of methanol or from 0.1 to 0.3 parts by weight of ethanol. When present any organic solvents present in the compositions of the present invention are desirably included in an amount of from about 0.01 to about 10% by weight.

One optional constituent which may also be included in the reaction mixture used to form the foamed polyurethane composition is a rubber, which may be either natural or synthetic. This has the effect of increasing the cure time for the polyurethane, and increases extensibility, strength and tack. Preferably, the rubber is added in the form of a latex, i.e. a suspension or emulsion of the rubber in an aqueous medium. The latex will generally comprise 40 to 70% solids by weight, preferably 50 to 60% by weight. Acrylic-based rubbers are particularly preferred. These are commercially available in the form of latexes, such as PRIMAL® B-15J and RHOPLEX® N-560 (ex. Rohm & Haas). When present, any rubber present in the compositions of the present invention are desirably included in an amount of from about 0.1 to about 5% by weight.

A further constituent which is optionally, but in certain cases desirably included in the reaction mixture used to form the foamed polyurethane composition aresilane based coupling agents, especially alkoxysilane coupling agents. Such coupling agents are per se, known to the art and include silane coupling agents of both the amino type and of the glycidyl type. Preferred commercially available alkoxysilane coupling agents are presently available under the tradename SILQUEST®. When present, silane based coupling agents are desirably included in an amount of from about 0.1 to about 1.0% by weight, or alternately in an amount of from about 0.01% wt. to about 4% wt. based on the weight of any bulking agents which may be present.

In accordance with certain aspects of the invention, a bulking agent, usually a solid bulking agent is incorporated into reaction mixture and thereby ultimately into the foamed polyurethane composition. While this is not essential, it is often desirable to include such a bulking agent to the reaction mixture particularly when a larger three dimensional foamed article is to form part of the cleaning article according to the present invention. Such bulking articles are, per se known to the art and especially are known to the relevant technical field relating to the formation of foam polyurethane articles. By way of non-limiting examples, such bulking agents include inorganic oxides and inorganic silicates e.g., wollastonite, pumice, feldspar, diatomaceous earth, garnet, and the like. When present, the total amount of bulking agent present in the compositions of the present invention are desirably included in an amount of from about 0.1 to about 50% by weight.

As noted previously, when such bulking agents are incorporated, it is also preferred that at least one silane compound also be included in the reaction mixture containing the polymer precursor. The silanes are useful as coupling agents for the bulking agents, particularly where such bulking agents are minerals and thereby facilitate the incorporation of the bulking agents into the three dimensional structure of the polyurethane foams.

According to certain particularly preferred embodiments foamed polyurethane compositions of the present invention and articles comprising said foamed polyurethane compositions are essentially free of silicon-based surfactants, such as the silicone oils and the siloxane oxyalkylene block copolymers as described to be an essential constituent in U.S. Pat. No. 4,476,251.

A still further constituent which may be included in the foamed polyurethane compositions of the present invention are an acid constituent which be a water soluble inorganic acid, or a water soluble organic acid or combination thereof. By way of non-limiting example useful inorganic acids include hydrochloric acid, phosphonic, and sulfuric acid. With respect to water soluble organic acids, generally include at least one carbon atom, and include at least one carboxyl group (—COOH) in its structure. Preferred are water soluble organic acids which contain from 1 to about 6 carbon atoms, and at least one carboxyl group as noted. Particularly preferred amongst such organic acids are: formic acid, citric acid, sorbic acid, acetic acid, boric acid, maleic acid, adipic acid, lactic acid, malic acid, malonic acid, glycolic acid, and mixtures thereof. According to certain preferred embodiments however, the acid constituent is a combination of citric acid in combination with at least one further acid selected from the group consisting of sorbic acid, acetic acid, boric acid, formic acid, maleic acid, adipic acid, lactic acid, malic acid, malonic acid, and glycolic acid. Most preferably, the acid constituent a lactic acid. When present, any acids present in the compositions of the present invention are desirably included in an amount of from about 0.1 to about 10% by weight.

The foamed polyurethane composition of the present invention may optionally include one or more further constituents which may aid in improving the appearance and/or handling characteristics of the cleaning articles of the invention. Such may be incorporated into the reaction mixture and are thus incorporated into the polyurethane foam. Where optional, they are frequently included so to aid in improving the attractiveness of a cleaning article according to the invention. By way of non-limiting examples, such further constituents include, coloring agents such as dyes, and pigments, fragrances whether derived from natural sources, or synthetically produced or both, agents directed towards the neutralization of the treatment of undesirable odors, and the like.

As noted above, the foamed polyurethane composition described herein may be used to form any of a number of cleaning articles. The cleaning article produced according to the present inventive teaching may take any number of forms and configurations. Indeed, it is to be understood that the ultimate physical form of the cleaning article may be varied in accordance with the desired form of the commercial product. By way of non-limiting example, the cleaning articles according to the invention may take any shape or forming in order to address a particular need in a cleaning and/or disinfecting application. Exemplary forms of the cleaning articles of the invention may be any molded three dimensional shape particularly in the form of a sponge, a sponge head such as for a mop, as well as a sponge head which may be removable or permanently affixed to a handle which may be gripped by a consumer. In such a latter configuration, such a sponge head affixed to a handle can be used in a variety of specialized cleaning purposes such as for example dishes, pots and pans, and when produced in a larger size, surfaces such as bathroom surfaces including the interior of toilet bowls. Alternately the cleaning article according to invention can be of a generally planar configuration such as in the form of a flexible sheet which can then be used as a wiping article. Such a flexible sheet is desirably sized so that it can be conveniently used by a consumer in contacting a surface such as a kitchen, bathroom surfaces, or other hard surfaces. Alternately the polyurethane foams which exhibit an antimicrobial benefit can be configured in the form of a ribbon or tape, and such a ribbon or tape can be used as a cleaning article, or used in the construction of a cleaning article. For example, a series of loops can be formed from a single piece, or from discrete pieces of such a ribbon or tape and affixed to a handle in such a way, a "loop brush" can be formed. Such a loop brush can be conveniently affixed to a handle and used in the manner described above in the cleaning of hard surfaces particularly kitchen, dishes, and lavatory surfaces. An advantage of such looped brush is that as opposed to a solid three dimensional foamed article, the loop brush features a greater degree of flexibility and that is maybe more appropriate for certain cleaning functions than others.

With regard to the cleaning articles, it is to be contemplated that further materials and/or further articles may be associated with the foamed polyurethane composition which exhibits an antimicrobial benefit. Such alternate materials may take any shape or form and can include, for example handles, grasping implements, and the like. Further materials which are particularly advantageously used in certain configurations of cleaning articles which are considered within the scope of the present invention are pads, woven sheets, non-woven sheets, abrasive pads, and the like. For example, according to certain particularly preferred embodiments of a cleaning article according to the present invention, a non-woven abrasive material, generally in the form of a pad, is bonded to the foamed polyurethane composition which exhibits an antimicrobial benefit. While any bonding means can be used, inter alia, stitching, adhesive, and the like, conveniently such an abrasive article is bonded to the polyurethane foam during the in-situ polymerization of the foamed polyurethane composition according to the invention. Such a technique is preferred as there is formed a physical bond between the polyurethane foam and the abrasive article which obviates the need for stitching, and or the need for an intermediate adhesive, or for other additional means which may unnecessarily increase the cost, or require a further manufacturing step in producing cleaning articles.

According to a particularly preferred aspect of the invention there is provided a cleaning article which exhibits an antimicrobial benefit, wherein the foamed polyurethane article comprises at least one layer of a fibrous substrate bonded to a sponge formed from the foamed polyurethane composition, and preferably comprises a foamed polyurethane composition layer layered in register and between two fibrous substrate layers.

By way of non-limiting examples, useful fibrous substrates can be of a woven or non-woven nature, and may take a variety of forms. Exemplary useful fibrous substrates can include nonwoven or woven materials (fabrics), and such substrates can be resin bonded, hydroentanged, thermally bonded, meltblown, needlepunched or any combination of the former. Such substrates may be formed form virtually any material including fibrous materials obtained from synthetic as well as naturally occurring sources. Nonwoven fibrous substrates are typically preferred from a cost standpoint however, nothing should be understood to inhibit the use of woven fibrous substrates as well.

Nonwoven fibrous substrates may be a combination of wood pulp fibers and textile length synthetic fibers formed by well known dry-form or wet-lay processes. Synthetic fibers such as rayon, nylon, orlon and polyester as well as blends thereof can be employed, with or without fibers obtained from naturally occurring sources, e.g., wood pulp fibers, cellulose and the like. In certain embodiments, the wood pulp fibers should comprise about 30 to about 60 percent by weight of the nonwoven fabric, preferably about 55 to about 60 percent by weight, the remainder being synthetic fibers. The wood pulp fibers provide for absorbency, abrasion and soil retention whereas the synthetic fibers provide for substrate strength and resiliency.

Examples of commercially available and particularly useful fibrous substrates include: Dexter® 10494 which is described to be a 70% viscose/30% polyolefin blend; Dexter® 5608 which is described to be a 45% cellulose/55% polyester and polypropylene blend; Dexter® 12086 which is described to be a 65% cellulose/30% rayon/5% synthetic fiber blend; Dexter® 8553-55 which is described to be approximately 80% cellulose, 20% rayon blend; Dexter® 12131 described to be a 65% cellulose/30% polyester blend containing a further 5% of a binder material; Dexter® 10471 which is described to be a 75% cellulose/7% rayon/10% polyester and 8% polyolefin blend; Spuntech® A080 described to be a 70% cellulose/30% polyester blend; Fiberlla® 4300 described to be a 50% cellulose/50% polyester blend; Vicotex® D6M-45 described to be a viscose/polyester blend; as well as Albad® SP50 described to be a 70% cellulose/30% polyester blend. Further and preferred examples of useful fibrous substrates are recited with reference to one or more of the Examples.

The fibrous substrates are typically supplied in the form of sheets or wide ribbons which are generally planar. Certain fibrous substrates including those which are amongst the preferred embodiments are constructed to provide an abrasive effect when applied to surfaces. Other fibrous substrates including those which are also amongst the preferred embodiments include those having a "quilted" pattern wherein regions of the fibrous substrate extend outwardly from the plane of the fibrous substrate thereby imparting a three-dimensional appearance.

A particularly preferred embodiment of a cleaning article according to the invention is a multilayered cleaning article which comprises a layer of the foamed polyurethane composition providing an antimicrobial benefit layered in register and between two fibrous substrate layers, particularly where one of said fibrous substrate layers is constructed to provide an abrasive effect, while the other said fibrous substrate layer includes a quilted pattern. Such an embodiment provides dual-function in that the abrasive layer may be used to improve the removal of soils or other materials on hard surfaces, while the opposite layer provides good water absorption and an attractive appearance. While any bonding means can be used, inter alia, stitching, adhesive, and the like, conveniently the two fibrous substrate layers are bonded to the intermediate polyurethane foam layer during the in-situ polymerization of the polyurethane foam.

In a particular aspect the present invention provides a polyurethane based foam composition, and articles formed therefrom, which exhibits a residual antimicrobial benefit. Said residual antimicrobial benefit is a very significant improvement over known-art cleaning articles. The inventors have found that according to preferred aspects of the invention, the cleaning articles comprising the foamed polyurethane composition exhibit a residual antimicrobial benefit even after the cleaning article has been saturated with water, particularly tap water, and rinsed a number of times. Particularly preferred embodiments of the invention are wherein a residual antimicrobial benefit is retained even after the cleaning article has been "rinse/squeeze" a large number of times. By the term "rinse/squeeze" is meant that the cleaning article is contacted in water to saturation (especially under a stream of running tap, or deionized water) and thereafter is manually squeezed or wrung to remove a significant proportion of the water (generally in excess of about 40% by weight) which had been absorbed. The present inventors have surprisingly found that good residual antimicrobial efficacy is retained in the cleaning articles according to the present invention.

According to one particularly preferred aspect of the invention, there is provided such a cleaning article comprising a foamed polyurethane composition as described herein which exhibits, following at least twenty five (25) rinse/squeeze cycles, more preferably following at least fifty (50) rinse/squeeze cycles, an elution of at least about 100 parts per million, preferably an elution of at least about 150 parts per million of the germicidal quaternary ammonium compounds in the fluid squeezed or wrung from the article.

According to another particularly preferred aspect of the invention, there is provided a cleaning article comprising the foamed polyurethane composition described herein which exhibits, following at least twenty (20) rinse/squeeze cycles, preferably at following at least fourth (40) rinse/squeeze cycles an elution of at least about 300 parts per million of the germicidal quaternary ammonium compounds in the water squeezed or wrung from the article.

According to a still further particularly preferred aspect of the invention, a cleaning article comprising the foamed polyurethane composition as described herein which exhibits, following at least fifty (50) rinse/squeeze cycles an elution of at least about 200 parts per million of the germicidal quaternary ammonium compounds in the water squeezed or wrung from the article.

According to a further particularly preferred aspect of the invention there is provided a cleaning article wherein the maximum thickness of the layer of foamed polyurethane composition present in a cleaning article is not in excess of about 10 millimeters, which cleaning article exhibits, following at least ten (10) rinse/squeeze cycles, more preferably following at least twenty (20) rinse/squeeze cycles, an elution of at least about 200 parts per million, preferably at least about 300 parts per million, but more preferably an elution of at least about 400 parts per million of the germicidal quaternary ammonium compounds in the fluid squeezed or wrung from the article.

Desirably, effective antimicrobial efficacy can be expressed as the concentration of germicidal quaternary ammonium compounds which are eluted from the cleaning article during the squeezing step. The concentration of the eluted quaternary ammonium compounds can be determined by routine analytical methods.

The present inventors surprisingly discovered that, in addition to exhibiting a residual antimicrobial property within the cleaning articles, that preferred embodiments of the cleaning articles of the invention also exhibit good "contact-kill" when exposed to an undesirable microorganism, particularly gram negative bacteria e.g., *Salmonella choleraesuis* and/or gram positive bacteria e.g. *Staphylococcus aureus*. Preferred embodiments of the invention demonstrate good antimicrobial efficacy against *Enterobacter aerogenes*. Such "contact to kill" is an important feature in a cleaning article, as rapid destruction of undesired micro-organisms can be achieved. Such as a particularly useful technical characteristic in a cleaning article in that it is contemplated that frequently, the same cleaning article is used to treat a variety of surfaces within a particular environment. For example, in a kitchen it is readily foreseen that a cleaning article can be used to, for example wash a cutting board or cutting surface, thereafter rinsed, and subsequently used to manually wash one or more dishes such as in a kitchen sink. The benefits of rapid kill are that undesired micro-organisms which are trapped or entrained upon the surface of the cleaning article following treatment of the cutting surface are rapidly destroyed, and such substantially lowers the likelihood of cross contamination of any micro-organisms on the cutting board or cutting surface with the surfaces of the dishes to be manually washed. And such an application, and according to preferred embodiments of the cleaning article, the cleaning article would first be moistened with water or with any other cleaning composition and used to wipe the cutting board or cutting surface, thereafter it is contemplated that it would be rinsed in water, wrung to remove a majority of the water entrained within the sponge, and thereafter used to manually wash the dishes. Due to the rapid contact kill, most, if not all of the undesired micro-organisms which may come into contact from the cutting board or cutting surface and into the cleaning article would be destroyed or deactivated prior to coming into contact with the dishes to be manually washed particularly when the protocol of an intermediate rinsing step is practiced as outlined above.

According to certain embodiments of the invention, the foamed polyurethane compositions which exhibit an antimicrobial benefit provide three concurrent technical functions namely, that of an absorbent carrier, at the same time as a controlled release, and as a reservoir for the quaternary ammonium compound having germicidal properties. When contacted with a fluid, particularly water, the solubility exhibited by the quaternary ammonium compound is limited and thus, only a proportion of the quaternary ammonium compound leaches out from the foamed polyurethane composition. As compared to prior art cleaning articles wherein generally most of any water soluble germicidal or sanitizing agent quickly leaches out after a relatively small number of rinse/squeeze cycles, surprisingly the quaternary ammonium compounds, particularly the preferred quaternary ammonium compounds appear to exhibit a strong affinity to the polyurethane foam. This strong affinity is believed to be a significant factor which provides for a surprisingly long useful life of the cleaning articles containing the foamed polyurethane compositions and the residual antimicrobial benefits. While not wishing to be bound by the following, it is believed that such an affinity exists, and that such an affinity between the polyurethane of the foamed polyurethane composition, and the quaternary ammonium compound having germicidal properties is responsible for the ability of the foamed polyurethane compositions to exhibit a useful antimicrobial benefit even after fifty (50) or even more rinse/squeeze cycles, and in some cases even after one hundred (100) rinse/squeeze cycles. While not wishing to be bound by the following it is hypothesized that during the production of the polyurethane foam the quaternary ammonium compound having germicidal properties is physically trapped within the cell walls of the polyurethane foam and this physical entrapment is responsible for the affinity between the polyurethane foam on the one hand and the quaternary ammonium compound on the other hand. Such physical entrapment is relatively long lasting, and contributes to the surprisingly long useful life of the cleaning article formed from or formed using the polyurethane foams taught herein and the residual antimicrobial benefit observed by the inventors.

Further, while not wishing to be bound by the following it is hypothesized that the inclusion of a nonionic block copolymer based on a polymeric ethoxy/propoxy units, especially PLURONIC® F88 may act to retard, or slow the release of the quaternary ammonium compound having germicidal properties from within the polyurethane foam.

The following examples below illustrate exemplary formulations and preferred foamed polyurethane compositions according to certain aspects of the invention. It is to be understood that these examples are presented by means of illustration only and that further useful formulations foamed polyurethane compositions fall within the scope of this invention and the claims may be readily produced by one skilled in the art and not deviate from the scope and spirit of the invention. Throughout this specification and in the accompanying claims, weight percents of any constituent are to be understood as the weight percent of the active portion of the referenced constituent, unless otherwise indicated.

EXAMPLES

Exemplary formulations illustrating certain preferred embodiments of foamed polyurethane compositions which exhibit an antimicrobial benefit according to the invention are described in more detail in Table 1. These below were formulated generally in accordance with the following protocol.

A reaction mixture is formed from two components, the first component being the polyurethane prepolymer composition, e.g., HYPOL JT6000, and the second component being a premixture of the remaining constituents. The second component was conveniently formed by combining its constituents in appropriate measured amounts in a standard laboratory glass beaker using conventional laboratory stirrer to ensure homogeneity of the second component. Next measured amounts of the first component and the second component were blended together using a standard laboratory stirrer using a paddle blade rotating at about 1000-9000 rpm for a period of about 1-30 seconds, especially between about 1-10 seconds to ensure good blending of the two components. Immediately thereafter the blended mixture was poured into a cavity mold and allowed to react to form a foamed polyurethane article which exhibits an antimicrobial benefit. Optionally a non-woven abrasive sheet material was applied to the upper open end of the cavity mold and at least a part of the surface of the rising polymerized foamed polyurethane article entangled the non-woven abrasive sheet material and formed a physical bond therewith. The foamed polyurethane article was thereafter removed from the cavity mold and it was ready for use.

The proportions, in % wt. of each of the constituents used to produce respective polyurethane foams which exhibit an antimicrobial benefit are described on Table 1. The amounts of the named constituents used in each Example are indicated in the "as supplied" amount of the product/material named. This amount may be less than or equal to the amount of the "actives" provided in the named constituent. The actual amount of actives is indicated on Table 2 which identifies the materials used in Table 1.

TABLE 1

| | Ex. 1 | Ex. 2 | Ex. 3 | Ex. 4 | Ex. 5 | Ex. 6 | Ex. 7 |
|---|---|---|---|---|---|---|---|
| Hypol JT6000 | 33.33 | 30.31 | 33.33 | 33.33 | 33.33 | 33.33 | 33.33 |
| Catagen T50 | — | — | — | — | — | — | — |
| BTC-65 | 6.67 | 6.97 | 6.67 | 6.67 | 6.67 | 6.67 | 6.67 |
| BTC-8358 | — | — | — | — | — | — | — |
| BTC-2125 M90 | — | — | — | — | — | — | — |
| benzethonium chloride | — | — | — | — | — | — | — |
| Hyamine 1622 Crystal | — | — | — | — | — | — | — |
| wollastonite 325 | 26.67 | 27.88 | — | 6.67 | 13.33 | 20.0 | — |
| Microglass | — | — | 26.67 | 20.0 | 13.33 | 6.67 | — |
| Feldspar | — | — | — | — | — | — | 20.0 |
| Tomadol 91-6 | 2.0 | 2.09 | 2.0 | 2.0 | 2.0 | 2.0 | 2.0 |
| Silquest A1120 | 0.16 | 0.28 | — | — | — | — | 0.16 |
| Pluronic F88 | 0.67 | 0.70 | 0.67 | 0.67 | 0.67 | 0.67 | 0.67 |
| Dowanol DPnB | 3.57 | 3.73 | 3.57 | 3.57 | 3.57 | 3.57 | 3.57 |
| fragrance | 0.3 | 0.31 | 0.30 | 0.30 | 0.30 | 0.30 | 0.3 |
| colorant | 0.36 | 0.38 | 0.36 | 0.36 | 0.36 | 0.36 | 0.36 |
| Purac Sanilac Acid | — | — | — | — | — | — | 6.67 |
| deionized water | 26.28 | 27.36 | 26.44 | 26.44 | 26.44 | 26.44 | 26.28 |

| | Ex. 8 | Ex. 9 | Ex. 10 | Ex. 11 | Ex. 12 | Ex. 13 | Ex. 14 | Ex. 15 |
|---|---|---|---|---|---|---|---|---|
| Hypol JT6000 | 33.33 | 33.33 | 33.33 | 33.33 | 33.33 | 33.33 | 33.33 | 33.33 |
| Catagen T50 | — | — | — | — | 6.67 | — | — | — |
| BTC-65 | 5.33 | 5.33 | 6.67 | — | — | 13.33 | — | — |
| BTC-8358 | 0.83 | 0.83 | — | — | — | — | — | — |
| BTC-2125 M90 | — | — | — | 7.41 | — | — | — | — |
| benzethonium chloride | — | — | — | — | — | — | 6.67 | — |
| Hyamine 1622 Crystal | — | — | — | — | — | — | — | 3.33 |
| wollastonite 325 | 26.67 | 26.67 | 26.67 | 26.67 | 26.67 | 26.67 | 26.67 | 26.67 |
| Microglass | — | — | — | — | — | — | — | — |
| Feldspar | — | — | — | — | — | — | — | — |
| Tomadol 91-6 | 2.0 | 2.0 | 2.0 | 2.0 | 2.0 | 2.0 | 2.0 | 2.0 |
| Silquest A1120 | 0.16 | 0.16 | 0.16 | 0.16 | — | 0.16 | 0.16 | 0.16 |
| Pluronic F88 | 1.33 | — | — | — | — | 3.33 | 3.33 | 0.67 |
| Dowanol DPnB | 3.57 | 3.57 | 3.57 | 3.57 | 3.57 | 3.57 | 3.57 | 3.57 |
| fragrance | 0.3 | 0.3 | 0.3 | 0.3 | 0.3 | 0.3 | 0.3 | 0.3 |
| colorant | 0.36 | 0.36 | 0.36 | 0.36 | 0.36 | 0.36 | 0.36 | 0.36 |
| Purac Sanilac Acid | — | — | — | — | — | — | — | — |
| deionized water | 26.12 | 27.45 | 26.95 | 26.21 | 27.11 | 16.95 | 23.61 | 29.61 |

| | Ex. 16 | Ex. 17 | Ex. 18 |
|---|---|---|---|
| Hypol JT6000 | 30.30 | 30.30 | 30.30 |
| Catagen T50 | — | — | — |
| BTC-65 | 6.97 | 6.97 | 6.97 |
| BTC-8358 | — | — | — |
| BTC-2125 M90 | — | — | — |
| benzethonium chloride | — | — | — |
| Hyamine 1622 Crystal | — | — | — |
| wollastonite 325 | 27.88 | 27.88 | 27.88 |
| Microglass | — | — | — |
| Feldspar | — | — | — |
| Tomadol 91-6 | 2.09 | 2.09 | 2.09 |
| Silquest A1120 | 0.28 | 0.28 | 0.28 |
| Pluronic F98 | 1.39 | — | — |
| Pluronic F98 | — | 1.39 | — |
| Pluronic F98 | — | — | 1.39 |
| Dowanol DPnB | 3.73 | 3.73 | 3.73 |
| fragrance | 0.31 | 0.31 | 0.31 |
| colorant | — | — | — |
| Purac Sanilac Acid | — | — | — |
| deionized water | 27.05 | 27.05 | 27.05 |

The identity of the specific constituents named in Table 1 are identified on Table 2, following:

TABLE 2

| | |
|---|---|
| Hypol JT6000 | polyurethane prepolymer preparation (ex. Dow Chemical Co.) |
| Catagen T50 | $C_8$-$C_{18}$ alkyl dimethyl benzalkonium ammonium chloride (50% wt. actives) in an aqueous carrier (ex. Stepan) |
| BTC-65 | $C_{12}$-$C_{16}$ alkyl dimethyl benzyl ammonium chloride provided in an aqueous alcoholic carrier (50% wt. actives) (ex. Stepan) |
| BTC-8358 | $C_{12}$-$C_{16}$ alkyl dimethyl benzyl ammonium chloride provided in an in an aqueous alcoholic carrier (80% wt. actives) |
| BTC-2125 M90 | $C_{12}$-$C_{16}$ dimethyl benzyl ammonium chloride (45% wt.), $C_{12}$-$C_{18}$ alkyldimethyl(ethylbenzyl) ammonium chloride (45% wt.) provided in an aqueous alcoholic carrier (90% actives) (ex. Stepan) |
| benzethonium chloride | benzyldimethyle[-2-(-2-[p-(1,1,3,3-tetramethylbutyl-)-phenoxy]-ethoxy]-ammonium chloride monohydrate in powder form (100% actives) (ex. Lonza) |
| Hyamine 1622 Crystal | diisobuylphenoxyethoxyethyl dimethyl benzyl ammonium chloride (50% wt.), inert constituents (50% wt.) in powder form |
| Wollastonite 325 | calcium silicate (100% actives) (ex Minera NYCO, S.A.) |
| Microglass | mixed oxides of silicon, calcium, aluminum, magnesium and boron fused in an amorphous vitreous state (100% actives) (ex. Fibertec) |
| Feldspar | aluminum silicate containing various amounts of sodium, potassium, and calcium (100% actives) (ex. Feldspar Corp.) |
| Tomadol 91-6 | $C_9$-$C_{11}$ alcohol ethoxylate (100% actives) (ex. Tomah) |
| Silquest A1120 | At least 70% of N-beta-(aminoethyl)-gamma-amine propyltrimethoxysilane, less than 30% wt. of siloxanes and silane esters, the balance being methanol and ethylene diamine (100% wt. actives) (ex. OSi) |
| Pluronic F88 | polyethylene/polypropylene block copolymer (a 10% solution of the polyethylene/polypropylene block copolymer of avg. molecular weight of 11400 dispersed in 90% water) (ex. BASF) |
| Pluronic F98 | polyethylene/polypropylene block copolymer (a 10% solution of the polyethylene/polypropylene block copolymer of avg. molecular weight of 13000 dispersed in 90% water) (ex. BASF) |
| Pluronic F108 | polyethylene/polypropylene block copolymer (a 10% solution of the polyethylene/polypropylene block copolymer of avg. molecular weight of 14600 dispersed in 90% water) (ex. BASF) |
| Pluronic F127 | polyethylene/polypropylene block copolymer (a 10% solution of the polyethylene/polypropylene block copolymer of avg. molecular weight of 12600 dispersed in 90% water) (ex. BASF) |
| Dowanol DPnB | dipropylene glycol n-butyl ether (100%) (ex. Dow Chemical Co.) |
| fragrance | proprietary composition |
| colorant | a premixture containing 0.79% wt. of Pluronic F88 (neat), 20% wt. of a green pigment, and 0.2% wt. of Silquest A1120, with the balance to 100% wt. being water. |
| Purac Sanilac Acid | L(+)-lactic acid in aqueous solution (80% wt. actives) |
| deionized water | deionized water |

The form of the sponges produced from the foamed polyurethane compositions described on Table 1 are illustrated on FIG. 1. As is visible, the sponge 10 comprises two parts, a body 12 of a polyurethane foam formed from the compositions described on Table 1, said body 12 having an upper curved surface 13 layered in register with a layer of a non-woven abrasive sheet material 14 contacting a lower flat surface 15 of the body 12.

Elution of Germicidal Quaternary Ammonium Compounds from Cleaning Articles

Several test sponges having compositions as described on Table 1 were saturated in water by holding under a stream of deionized water and thereafter each test sponge was manually squeezed or wrung to remove a significant proportion of the water (generally in excess of about 40% by weight, preferably at leas 50% by weight, more preferably at least about 75% by weight) which had been absorbed. Each such operation was a "squeeze/wring cycle." Each test sponge was evaluated for a sequence of squeeze/wring cycles and the amount of quaternary ammonium compound in the eluted water was evaluated according to conventional laboratory methods. The results are reported below; the amounts of the quaternary ammonium compound in the eluted water is indicated in parts per million (ppm) following the indicated number of squeeze/wring cycles.

| Example 1 | |
|---|---|
| 20 squeeze/wring cycles | 340 ppm |
| 50 squeeze/wring cycles | 113 ppm |

| Example 2 | |
|---|---|
| 20 squeeze/wring cycles | 368 ppm |
| 40 squeeze/wring cycles | 340 ppm |
| 50 squeeze/wring cycles | 283 ppm |
| 40 squeeze/wring cycles | 142 ppm |

| Example 13 | |
|---|---|
| 20 squeeze/wring cycles | 566 ppm |
| 40 squeeze/wring cycles | 368 ppm |
| 50 squeeze/wring cycles | 340 ppm |
| 100 squeeze/wring cycles | 198 ppm |
| 120 squeeze/wring cycles | 170 ppm |

| Example 14 | |
|---|---|
| 20 squeeze/wring cycles | 541 ppm |
| 40 squeeze/wring cycles | 361 ppm |
| 50 squeeze/wring cycles | 252 ppm |
| 100 squeeze/wring cycles | 361 ppm |
| 120 squeeze/wring cycles | 216 ppm |
| 140 squeeze/wring cycles | 144 ppm |

Antimicrobial Evaluation

Test Microorganism:

The microorganism used for the antimicrobial evaluation of cleaning articles was *Enterobacter aerogenes* (ATCC#13048).

Preparation of Test Sponges

Each of the tested cleaning articles were formed sponges having a mass of approximately 31-37 grams. The compositions of the test sponges are described on Table 1. Each test sponge was aseptically removed from its packaging and stored in a large, sterile Petri dish. Each Petri dish (also referred to as "plates" herein) was uniquely labeled to identify the test sponge contained within. Between assays, and when not in use for testing, the large Petri dishes containing each of the test sponges was stored in a laminar flow hood.

For the antimicrobial evaluation of test sponges, three replicates (3 separate sponges) of a test sponge composition were used.

Preparation of the Test System (Culture Transfer)

From a stock culture (e.g. a frozen culture), a transfer was performed into an appropriate growth media, and incubated at 35+2.5° C. overnight. This transfer was labeled To for *Enterobacter aerogenes*, and the cultures were incubated at 30° C.

Three consecutive 24-hour culture transfers were performed, and sequentially labeled as T1, T2, and T3.

After this 3rd transfer, one daily broth transfer was skipped. For further transfers beyond the 3rd transfer "T3" e.g., up to and including an eight transfer identified as "T8", an aliquot (e.g. 100 mL bottle, 350 mL flask) of growth broth was inoculated at a ratio of 1:1000. Similarly, transfers were inoculated and incubated overnight at 30+1.0° C. to obtain the *E. aerogenes* test inoculum.

Preparation of Test Culture(S)

The test inoculum was poured through a sterile funnel containing coarse filtration medium (e.g. glass wool) to remove any particulate matter.

An appropriate amount of the filtered culture was pipetted into a sterile vessel and a sufficient volume of organic soil, horse serum, was added to achieve a final concentration of 5% (v/v). Any combination of culture/organic soil (e.g. 9.5 mL/0.5 mL) that results in a final concentration of 5% organic soil was considered acceptable. The prepared mixtures were vortexed; thereafter these prepared mixtures were referred to as "test culture" (or "test cultures").

Inoculation of the Test Surface:

On each assay day, for each sponge tested, four sterile 100 mm Petri dishes were used. A 2½ square was inscribed on the bottom exterior of each Petri dish. For each tested sponge replicate, each of the four Petri dishes were labeled with the identity of the tested sponge, and either a 1, 2, 3 or R.

Plate 1 was inoculated with 0.01 to 0.03 mL of the test system and dried, and was used to soil the test sponge.

Plate 2 was inoculated with 0.01 to 0.03 mL of the test system and was used to assay the sanitization efficacy of liquid eluted from the test sponge.

Plate 3 was inoculated with 0.01 to 0.03 mL of the test system and was used to assay the sanitization efficacy of the test sponge after it is used to wipe the test surface.

Plate R was not inoculated and was used to assay the amount of bacteria redeposited after wiping the test sponge after the previous steps of were performed.

For each test system, 3 additional plates marked with a 2½ square were also inoculated and dried. These plates serve as "dried recovery count plates."

(For example, if 8 tested cleaning article replicates are being tested for *Enterobacter aerogenes*, then a total of 27 plates were be inoculated, viz, 3 plates per tested cleaning article replicate plus 3 dried recovery count plates).

The total number of plates per test system may have been inoculated and dried all at once, or dried in sets depending on the testing plan or schedule. Dried recovery count plates were usually assayed last to truly reflect the number of organisms surviving the incubator drying as well as any additional drying that occurred while sitting on the laboratory benchtop.

Carrier Drying:

The inoculated test plates were dried at 35+2.5° C. for 15-20 minutes. Drying temperatures outside of this range, and for a longer period of time, was considered acceptable if the assay recovery control counts were within the expected and acceptable ranges. After this drying period, the complete drying of the test culture on all of the test plates (Petri dishes) was ensured.

Treatment of the Test System with the Test Sponge:

Each test sponge was tested in the following manner on each assay date.

Wearing a new set of sterile gloves for each tested cleaning article, the tester (technician) held the test sponge under lukewarm running water (approximately 80 to 105° F./26.7 to 40.5° C.) provided from a municipal water source, viz., tap water. The test sponge was then squeezed to remove any excess water. This rinsing and squeezing (rinse/squeeze cycle) simulated the wetting of the test sponge and squeezing out of excess water prior to use in the household. This rinse/squeeze sequence was performed 3 times.

After the 3rd squeeze, the test sponge was used to wipe the inoculated bottom of Plate 1 (Petri dish) for 2-3 seconds. This step represented a periodic challenge with a microbiological bioburden (viable test bacteria dried onto surfaces/carriers which are wiped.)

An additional sequence of 7 tap water rinses/squeezes was performed. After the 10th daily rinse/squeezes was performed, the liquid from the test sponge was eluted onto the inoculated surface of Plate 2; this inoculated plate was not thereafter wiped.

Thereafter, the inoculated surface of Plate 3 was then wiped with the test sponge for 5 seconds.

A contact time of "X" was initiated from Plate 2 and Plate 3.

The bottom sterile surface of Plate R was then wiped with the test sponge to assess for any redeposition. Twenty (20) mL of neutralizer may have been added to Plate R immediately after wiping.

At the contact time of "X", 20 mL of neutralizer broth was poured onto the test surfaces of Plates 2 and 3. A cell scraper was used to resuspend any organisms remaining on the surfaces of Plates 2 and 3. Thereafter serial dilutions from each plate (Plates 2,3 and R) were performed, and the appropriate dilutions were plated, in a conventional manner.

This sequence was repeated several times utilizing the same test sponge, so that the performance of a test sponge over a sequence of days, with 10 rinse/squeeze cycles performed on each assay day, could be evaluated. The sequence was performed on sequential calendar days, as well as non-sequential calendar days where days were omitted, e.g., wherein the testing was not performed over two weekend days, but resumed during the following work week.

Serial Dilutions and Plating:

Test Plates 2, 3 and R were considered the 100 dilution. Dilutions of 100, 101 and 102 were plated for each tested cleaning article replicate. Dilutions of 100, 101 and 102 were plated for the test substance replicates. Dilutions of 101, 102 and 103 were plated for any "control" replicates. Dilutions of 101, 102 and 103 were plated for the dried recovery control replicates. One (1) mL aliquots of each dilution were plated, and poured with Trypticase Soy Agar ("TSA").

Incubation:

The test surfaces contacted with *E. aerogenes* were incubated at 30+1.0° C. for over 2 nights; incubation in excess of 2 nights is acceptable as long as the culture media was not dehydrated.

Quantitation of Results:

The number of survivors present on the plates were quantitated and the resulted recorded. The results indicated below indicate the averaged results for the 3 replicates of the test sponges. The sequence of the days is indicated in order of calendar days, which may not be sequential. In the tables below, the results in the column indicated as "L" indicated the number of colonies of surviving *Enterobacter aerogenes* present on the plate (Plate 2) onto which the liquid was eluted from the test sponge, the results in the column indicated as "W" indicated the number of survivors present on the plate (Plate 3) which was wiped with the test sponge, the results in the column indicated as "R" indicated the number of survivors present on the plate (Plate R) which was wiped in order to assay the redeposition of *Enterobacter aerogenes*. The minimum threshold in determining the number of survivors present on a plate was 20 survivors; any value less than 20 ("<20") indicated extremely effective eradication of *Enterobacter aerogenes* on a plate.

Test Sponge according to Example 1

| Calendar Day | Total number of rinse/squeeze cycles | L | W | R |
|---|---|---|---|---|
| 1 | 10 | <20 | <20 | <20 |
| 2 | 20 | <20 | <20 | <20 |
| 3 | 30 | <20 | <20 | <20 |
| 4 | 40 | 806 | <20 | <20 |
| 7 | 50 | <20 | <20 | <20 |
| 8 | 60 | <20 | <20 | <20 |
| 9 | 70 | <20 | <20 | <20 |
| 10 | 80 | <20 | <20 | <20 |
| 11 | 90 | <20 | <20 | <20 |
| 14 | 100 | <20 | <20 | <20 |

Test Sponge according to Example 13

| Calendar Day | Total number of rinse/squeeze cycles | L | W | R |
|---|---|---|---|---|
| 1 | 10 | <20 | <20 | <20 |
| 2 | 20 | <20 | <20 | <20 |
| 3 | 30 | <20 | <20 | <20 |
| 4 | 40 | <20 | <20 | <20 |
| 7 | 50 | <20 | <20 | <20 |
| 8 | 60 | <20 | <20 | <20 |
| 9 | 70 | <20 | <20 | <20 |
| 10 | 80 | <20 | <20 | <20 |
| 11 | 90 | <20 | <20 | <20 |
| 14 | 100 | <20 | <20 | <20 |
| 15 | 110 | <20 | <20 | <20 |
| 16 | 120 | <20 | 13.3 | <20 |
| 18 | 130 | <20 | 587 | <20 |
| 21 | 140 | <20 | <20 | <20 |
| 22 | 150 | <20 | <20 | <20 |
| 23 | 160 | <20 | <20 | <20 |
| 29 | 170 | <20 | <20 | <20 |
| 30 | 180 | <20 | 40 | <20 |

Test Sponge according to Example 14

| Calendar Day | Total number of rinse/squeeze cycles | L | W | R |
|---|---|---|---|---|
| 1 | 10 | <20 | <20 | <20 |
| 2 | 20 | <20 | <20 | <20 |
| 3 | 30 | <20 | <20 | <20 |
| 4 | 40 | <20 | <20 | <20 |
| 5 | 50 | <20 | <20 | <20 |
| 8 | 60 | <20 | <20 | <20 |
| 9 | 70 | <20 | <20 | <20 |
| 10 | 80 | <20 | <20 | <20 |

-continued

Test Sponge according to Example 14

| Calendar Day | Total number of rinse/squeeze cycles | L | W | R |
|---|---|---|---|---|
| 12 | 90 | <20 | <20 | <20 |
| 15 | 100 | <20 | <20 | <20 |
| 16 | 110 | <20 | <20 | <20 |
| 17 | 120 | <20 | <20 | <20 |
| 23 | 130 | <20 | 33.3 | <20 |
| 24 | 140 | <20 | <20 | <20 |
| 25 | 150 | <20 | <20 | <20 |
| 30 | 160 | 2.78 ($10^4$) | <20 | <20 |
| 32 | 170 | <20 | <20 | <20 |
| 33 | 180 | <20 | 60 | <20 |

As can be seen from the foregoing, the tested cleaning articles (test sponges) produced according to the inventive teaching exhibited a good residual antimicrobial benefit is retained even after the cleaning article has been rinse/squeeze cycled a large number of times.

Multilayered Cleaning Article

Figure 2A:
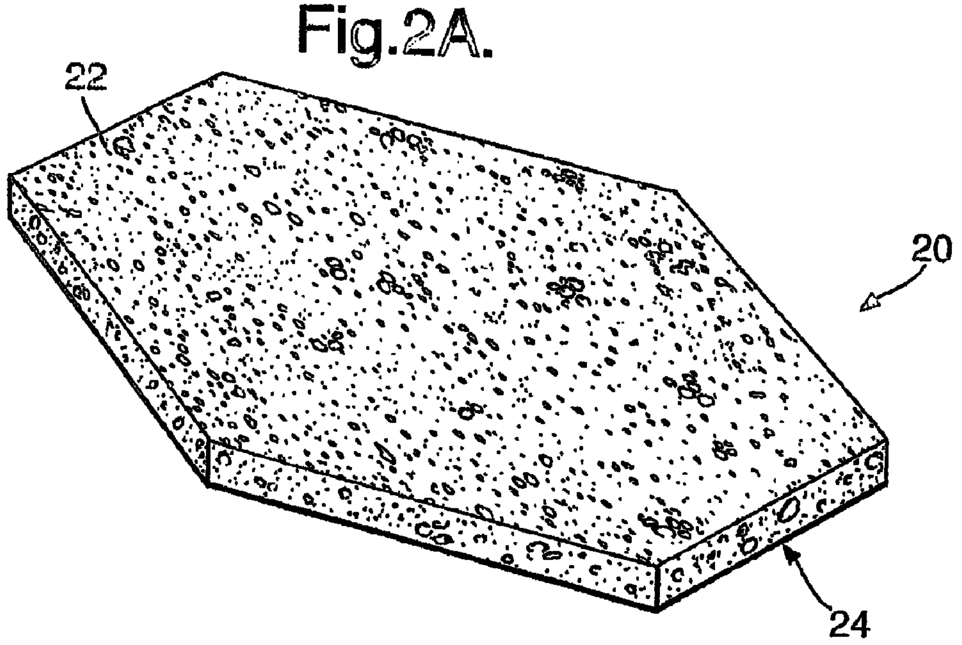
FIGS. 2A and 2B depicts two views of a further embodiment of a cleaning article according to the invention in the form of a multilayered cleaning article.
Figure 2B:
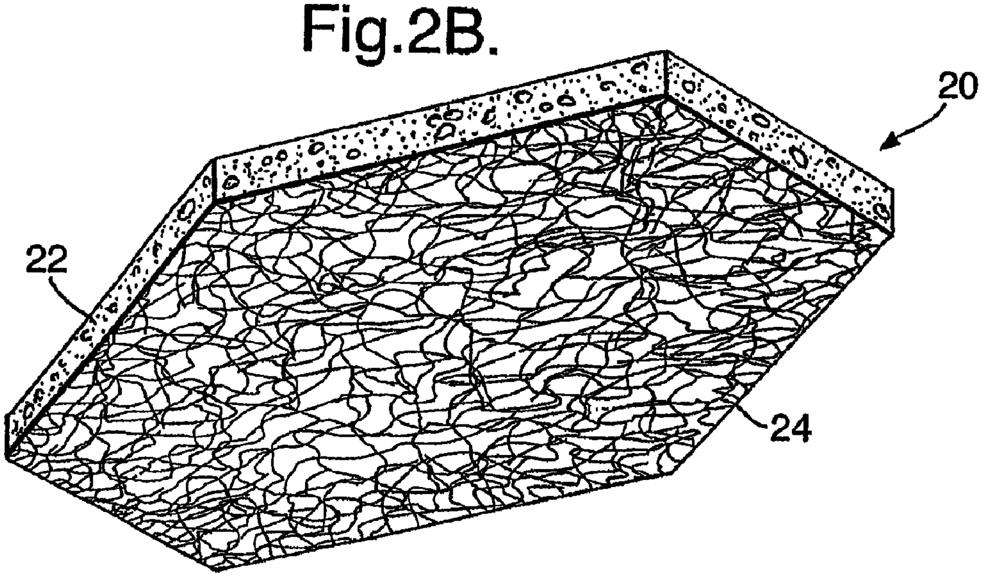

A multilayered cleaning article as depicted on FIGS. 2A and 2B comprising a layer of a foamed polyurethane composition according to the invention layered in register with a first abrasive fibrous substrate layer was produced.

A first sheet of an abrasive non-woven material was applied onto a flat laboratory benchtop and sprayed with approximately 10-12 grams of form release agent, LPS Heavy Duty Silicone Lubricant. The purpose of the form release agent was to ensure that the first sheet of abrasive non-woven material could be ultimately peeled away from the formed sponge article. Next, a reaction mixture is formed from two components, the first component being the polyurethane prepolymer composition, e.g., HYPOL JT6000, and the second component being a premixture of the remaining constituents all of which are identified on Table 3, following. The second component was conveniently formed by combining its constituents in appropriate measured amounts in a standard laboratory glass beaker using conventional laboratory stirrer to ensure homogeneity of the second component. Advantageously the second component is first formed by first providing the water to a suitable vessel, using a laboratory stirrer the Wollastonite 325 is added until a suspension is formed, followed by the Silquest 1120 which is allowed to mix approximately 10-20 minutes a homogenous mixture is attained, followed by the Tomadol 91-6, then Pluronic F88, then fragrance, then dye, followed by the Dowanol DPnB, and ultimately the BTC 65 and following the addition of the final constituent mixing is allowed to continue for further 20 minutes. Next measured amounts of the first component and the second component were blended together using a standard laboratory stirrer using a paddle blade rotating at about 1000-9000 rpm for a period of about 1-30 seconds, especially between about 1-10 seconds to ensure good blending of the two components.

Immediately thereafter the blended mixture was poured and evenly spread using a thin flat blade onto the surface of the sprayed, abrasive non-woven material. Foaming initiated and approximately 5-30 seconds after initiation of foaming but before the conclusion of the foaming reaction, excess foam was removed using the thin flat blade and thereafter a further non-woven fibrous substrate material (SAB 36D-45-B) was applied directly to the exposed polyurethane foam and thereafter a flat plate was applied onto the further non-woven fibrous substrate material layer. The flat plate was spaced apart from the said flat surface contacting the non-woven fibrous substrate material via a series of spacer elements which ensured that the flat surface was approximately parallel to the plate. After the conclusion of the foaming reaction (approx. 3-7 minutes) the plate was removed; the first sheet of an abrasive non-woven material was peeled away to expose the polyurethane foam surface opposite to that of the further non-woven fibrous substrate material. Thereafter the first the resultant multilayered construction was cut into square shapes of approximately 5¼ inches by 5¼ inches with the ultimate thickness of these dual-layered flexible wiping articles approximately 2-10 millimeters.

The ultimate composition of the foamed polyurethane composition layer of the multilayered cleaning article was as follows:

TABLE 3

| Commercial name | % wt. |
|---|---|
| HYPOL JT6000 | 30.30 |
| Wollastonite 325 | 27.88 |
| SILQUEST 1120 | 0.28 |
| BTC-65 | 6.97 |
| TOMADOL 91-6 | 2.09 |
| PLURONIC F88 | 0.70 |
| DOWANOL DPnB | 3.73 |
| coloring agent | 0.01-0.1 |
| fragrance | 0.31 |
| deionized water | q.s. |

The identity of the specific constituents are described on Table 2, supra.

The multilayered cleaning article described herein may also be produced by a continuous casting process in place of the batch type process recited above.

With reference now to FIGS. 2A and 2B, there is depicted a preferred embodiment of a multilayered cleaning article 20 which is depicted in two views, illustrating the relationship of the polyurethane foam layer 22 layered in register with the layer of a non-woven fibrous substrate material 24. No intermediate adhesive material or layer is required, and the hexagonal shape provides a comfortable gripping surface, facilitating convenient use by a consumer. Such a preferred embodiment differs from the resultant multilayered construction described immediately above only due to the fact that it is cut into a hexagonal shape as opposed to a square shape.

The elution of the germicidal quaternary ammonium compounds in the water squeezed or wrung from the 5¼ inch by 5¼ inch dual-layered flexible wiping articles formed according to the process described above were evaluated according to the following general protocol. For the evaluation, three samples (replicates), respectively “A”, “B” and “C” of dual-layered flexible wiping articles formed as described above and including the composition of Table 3 were tested.

Testing of each sample was in accordance with the following general protocol: Each sample was first wetted by a five second contact with a flow of room temperature (approx. 20° C.) deionized water flowing from a 5 gallon laboratory dispenser. After the 5 second exposure, the sample was withdrawn and held at one edge so that the replicate was oriented vertically and allowed to drain, thereafter the sample was hand-squeezed to remove at least 50% of the absorbed water and the released eluted liquid was collected and subsequently analyzed for content of eluted quaternary ammonium compounds. This procedure was repeated using the same sample of the dual-layered flexible wiping articles for 100 such squeeze/wring cycles and samples of the released eluted liquid were collected from the 1st, 10th, 20th, 30th, 40th, 50th, 60th, 70th, 80th, 90th and 100th squeeze/wring cycles.

The quantity of eluted germicidal quaternary ammonium compounds were evaluated by a standard analytical technique via titration utilizing a tetraphenylborate solution. Of course other analytical techniques may be used and are expected to provide comparable results.

The quantity of eluted germicidal quaternary ammonium compounds expressed as parts per million (ppm) from each of samples A, B and C are indicated on the following Table 4A which indicates the individual results following the respectively indicated squeeze/wring cycle as well as averaged results for all three samples.

TABLE 4A

| | eluted germicidal quaternary ammonium compounds (ppm) | | | |
|---|---|---|---|---|
| squeeze/wring cycle | Sample A | Sample B | Sample C | Averaged results |
| 1 | 2322 | 2832 | 2407 | 2520 |
| 10 | 850 | 793 | 906 | 850 |
| 20 | 425 | 538 | 510 | 491 |
| 30 | 312 | 340 | 453 | 368 |
| 40 | 283 | 312 | 368 | 321 |
| 50 | 283 | 283 | 255 | 274 |
| 60 | 198 | 255 | 227 | 227 |
| 70 | 113 | 198 | 198 | 170 |
| 80 | 113 | 113 | 142 | 123 |
| 90 | 85 | 85 | 113 | 94 |
| 100 | 57 | 57 | 57 | 57 |

As can be seen from the foregoing the samples of the dual-layered flexible wiping articles provide excellent and long-lasting elution of the germicidal quaternary ammonium compounds.

Tri-Layered Cleaning Article (1)

Figure 3A:
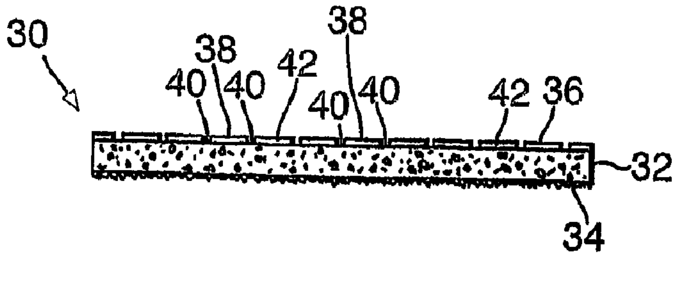
FIGS. 3A, 3B and 3C depict several views of a yet further embodiment of a cleaning article according to the invention in the form of a tri-layered cleaning article.
Figure 3B:
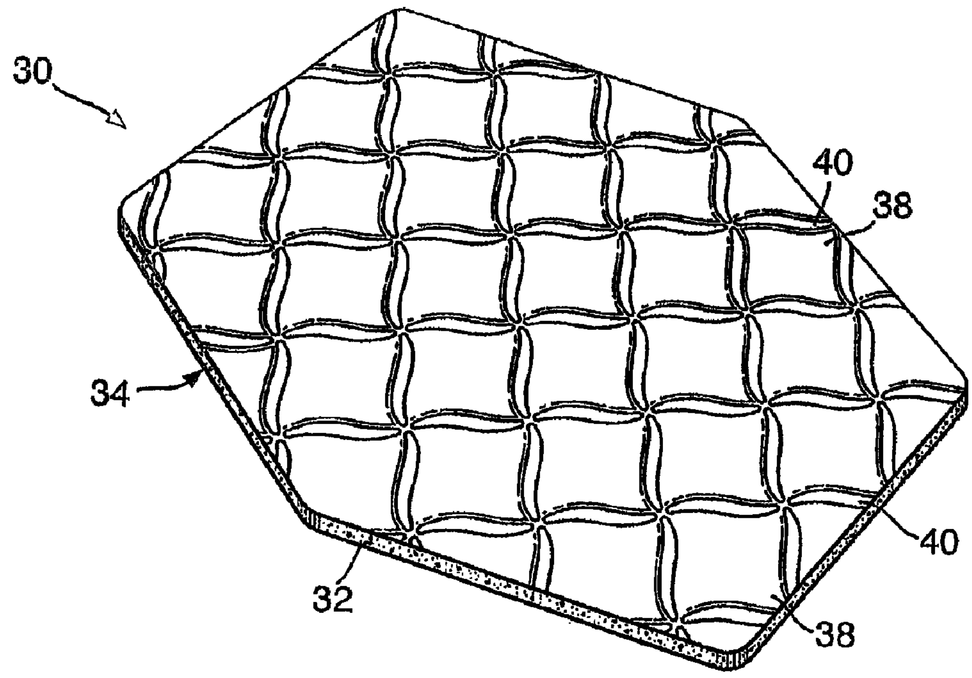
Figure 3C:
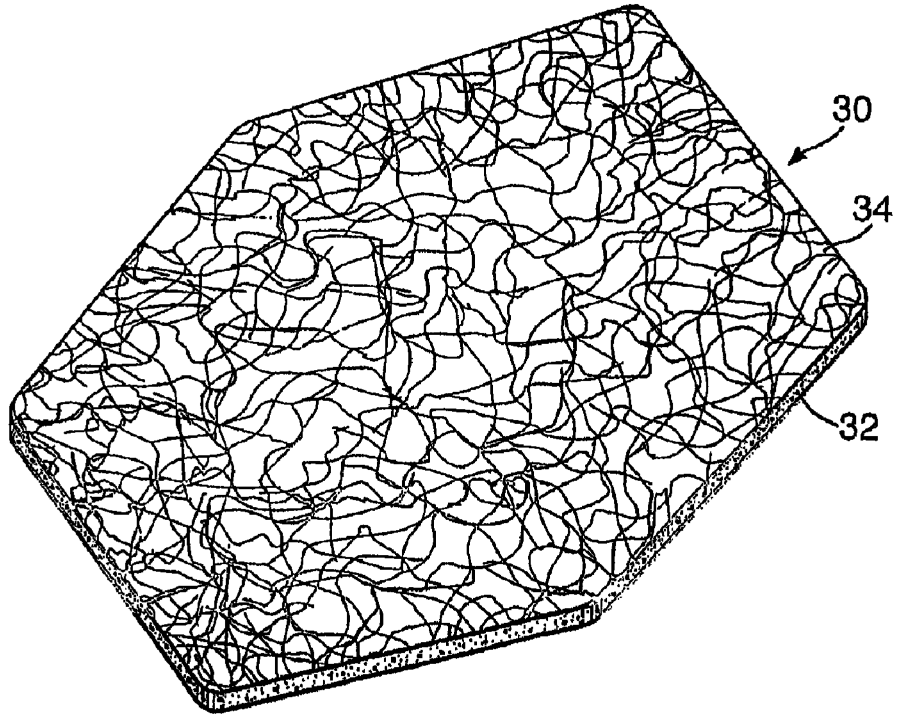

A tri-layered cleaning article as depicted on FIGS. 3A, 3B and 3C comprising a layer of a foamed polyurethane composition layered in register and between a first abrasive fibrous substrate layer and a second fibrous substrate layer including a quilted pattern was produced.

First, a sheet of a non-woven fibrous substrate material (Dexter® 10494 having a “quilted” surface) was applied to a flat laboratory benchtop. Subsequently a reaction mixture was formed from two components, the first component being the polyurethane prepolymer composition, e.g., HYPOL JT6000, and the second component being a premixture of the remaining constituents all of which are identified on Table 4, following. The second component was conveniently formed by combining its constituents in appropriate measured amounts in a standard laboratory glass beaker using conventional laboratory stirrer to ensure homogeneity of the second component. Advantageously the second component is first formed by first providing the water to a suitable vessel, using a laboratory stirrer the Wollastonite 325 is added until a suspension is formed, followed by the Silquest 1120 which is allowed to mix approximately 10-20 minutes a homogenous mixture is attained, followed by the Tomadol 91-6, then Pluronic F88, then fragrance, then dye, followed by the Dowanol DPnB, and ultimately the BTC 65 and following the addition of the final constituent mixing is allowed to continue for further 20 minutes. Next measured amounts of the first component and the second component were blended together using a standard laboratory stirrer using a paddle blade rotating at about 1000-9000 rpm for a period of about 1-30 seconds, especially between about 1-10 seconds to ensure good blending of the two components. Immediately thereafter the blended mixture was poured and evenly spread using a thin flat blade onto the surface of the abrasive non-woven fibrous substrate. Foaming initiated and approximately 5-30 seconds after initiation of foaming but before the conclusion of the foaming reaction, excess foam was removed using the thin flat blade and thereafter a sheet of an abrasive non-woven fibrous substrate material (VICOTEX D6M-45) was applied directly to the exposed polyurethane foam and thereafter a flat plate was applied onto the second non-woven fibrous substrate material layer. The flat plate was spaced apart from the said flat surface contacting the non-woven fibrous substrate material via a series of spacer elements which ensured that the flat surface was approximately parallel to the plate. After the conclusion of the foaming reaction (approx. 5-7 minutes) the plate was removed; the resultant tri-layered construction was cut into hexagonal shapes of approximately 5 inches by 6 inches, and the ultimate thickness of the flexible wiping article was approximately 2-8 millimeters. The ultimate composition of the foamed polyurethane composition layer of the multilayered cleaning article was as follows:

TABLE 5

| Commercial name | % wt. |
|---|---|
| HYPOL JT6000 | 30.30 |
| Wollastonite 325 | 27.88 |
| SILQUEST 1120 | 0.28 |
| BTC-65 | 6.97 |
| TOMADOL 91-6 | 2.09 |
| PLURONIC F88 | 0.70 |
| DOWANOL DPnB | 3.73 |
| coloring agent | 0.01-0.1 |
| fragrance | 0.31 |
| deionized water | q.s. |

The identity of the specific constituents are described on Table 2, supra.

The multilayered cleaning article described herein may also be produced by a continuous casting process in place of the batch type process recited above.

A further embodiment of tri-layered cleaning article 30 is depicted on FIGS. 3A, 3B and 3C. In this side-plan view there is depicted a foamed polyurethane layer 32 layered in register and between a first abrasive fibrous substrate layer 34 and a second fibrous substrate layer 36 comprising a quilted pattern having raised regions 38 bounded by recessed regions 40 which recessed regions are bonded to the foamed polyurethane layer 32 while the raised regions 38 are not. Such a construction defines cavities 42 between the surface of the foamed polyurethane layer 32 and the raised regions 38, as bounded by the portion of the recessed regions 40 of the fibrous layer 36 not adhered to the foamed polyurethane layer. Such an embodiment is preferred as it provides to the consumer two different types of surfaces, e.g., an abrasive non-woven wipe surface, and a more absorbent "quilted" non-woven wipe surface as integral parts of the cleaning article, providing a choice to the consumer as to which surface is more appropriately used for particular use e.g., for the treatment of a particular surface or removal of a particular type of stain. For example more difficult to use inorganic deposits such as mineral salts may be more aggressively removed using the fibrous abrasive substrate layer 34, while general treatment of non-stained surface or absorption of a spilled liquid might be more appropriately treated using the obverse side and use of the more absorbent "quilted" non-woven wipe surface. It is to be understood that while not visible in FIG. 3, the preferred form of the depicted wipe is a hexagonal format such as shown in FIGS. 2A and 2B, as well as in FIGS. 3A, 3B and 3C although other formats and configurations are also considered to be suitable for use as well.

The inventors have also found that the formation of a cleaning article which does require formation in a mold, such as the embodiment of FIG. 1 avoids the likelihood that during the foaming reaction the region of the polyurethane sponge contacting a smooth mold surface does not unduly densify adjacent to such a smooth mold surface and form a dense outer layer, conveniently referred to as a "skin" layer. The presence of such a skin layer is generally to be avoided as such both resists the absorption and elution of liquids through such a skin layer which may inhibit the elution of the germicidal quaternary ammonium compounds from the cleaning article. Further the inventors have observed that over prolonged use this skin layer often ruptures or cracks which lends an unsightly appearance to the product.

Thus the forms of the multilayer cleaning articles depicted on FIGS. 2A and 2B as well as FIGS. 3A, 3B and 3C are preferred. In accordance with the protocol for the manufacture of the article depicted on FIGS. 2A and 2B the use of a first layer of a non-woven material coated with a mold release lubricant permits for the removal of said non-woven material following the conclusion of the foaming reaction which removes any skin layer which may have formed. Of course other techniques such as splitting or cutting away the skin layer may also be practiced with similar beneficial effect as well. The embodiment according to FIGS. 3A, 3B and 3C is to be even more preferred as the presence of the two layers of non-woven material which contact the polyurethane foam during the foaming reaction deny the formation of a skin layer, rather the foaming polyurethane bonds to the non-woven material thereby avoiding the need for any intermediate adhesive and denying the formation of a skin layer.

Tri-Layered Cleaning Article (2)

A further embodiment of tri-layered cleaning article comprising a layer of foamed polyurethane composition layered in register and between a first abrasive fibrous substrate layer and a second fibrous substrate layer using the protocol described above with reference to the tri-layered cleaning article (1), and using the same formulation described on Table 4. In the present tri-layered cleaning article, a first sheet of a non-woven fibrous substrate material (Ahlstrom 150 GMS) having an embossed quilted surface with raised regions, and further sheet of an abrasive non-woven fibrous substrate material (SAB D6-MB50B) was used in place of the respective substrate materials recited with reference to the tri-layered cleaning article (1). The resultant tri-layered cleaning article formed was cut into hexagonal shapes of approximately 5 inches by 7 inches, and the ultimate thickness of the flexible wiping article was approximately 2-8 millimeters, as depicted on FIGS. 3A, 3B and 3C.

Tri-Layered Cleaning Article (3)

A further embodiment of tri-layered cleaning article comprising a layer of foamed polyurethane composition layered in register and between a first abrasive fibrous substrate layer and a second fibrous substrate layer using the protocol described above with reference to the tri-layered cleaning article (1), and using the same formulation described on Table 4. In the present tri-layered cleaning article, a first sheet of a non-woven fibrous substrate material (supplied by ADS Texel) and further sheet of an abrasive non-woven fibrous substrate material (SAB D6-MB50B) was used in place of the respective substrate materials recited with reference to the tri-layered cleaning article (1). The resultant tri-layered cleaning article formed was cut into hexagonal shapes of approximately 5 inches by 7 inches, and the ultimate thickness of the flexible wiping article was approximately 2-8 millimeters, as depicted on FIGS. 3A, 3B and 3C.

Tri-Layered Cleaning Article (4)

A further embodiment of tri-layered cleaning article comprising a layer of the foamed polyurethane composition layered in register between a first abrasive fibrous substrate layer and a second fibrous substrate layer using the protocol described above with reference to the tri-layered cleaning article (1), and using the same formulation described on Table 4. In the present tri-layered cleaning article, a first sheet of a non-woven fibrous substrate material (Ahlstrom 125 GSM, LSW Substrate, thermally bonded with a further non-woven pad) and further sheet of an abrasive non-woven fibrous substrate material (SAB D6-MB50B) was used in place of the respective substrate materials recited with reference to the tri-layered cleaning article (1). The resultant tri-layered cleaning article formed was cut into symmetrical hexagonal shapes measuring 5 inches between opposite vertices, and the ultimate thickness of the flexible wiping article was approximately 2-8 millimeters, as depicted on FIGS. 3A, 3B and 3C.

Tri-Layered Cleaning Article (5)

A further embodiment of tri-layered cleaning article comprising a foamed polyurethane composition layer layered in register and between a first abrasive fibrous substrate layer and a second fibrous substrate layer using the protocol described above with reference to the tri-layered cleaning article (1), and using the same formulation described on Table 4. In the present tri-layered cleaning article, a first sheet of a non-woven fibrous substrate material (Ahlstrom 125 GSM, LSW Substrate, thermally bonded with a further non-woven pad) and further sheet of an abrasive non-woven fibrous substrate material (SAB D6-MB50B) was used in place of the respective substrate materials recited with reference to the tri-layered cleaning article (1). The resultant tri-layered cleaning article formed was cut into a hexagonal shape measuring 5 inches in maximum width, and 6 inches in maximum height, and the ultimate thickness of the flexible wiping article was approximately 2-8 millimeter, as depicted on FIGS. 3A, 3B and 3C.

Tri-Layered Cleaning Article (6)

A further embodiment of tri-layered cleaning article comprising a layer foamed polyurethane composition layered in register and between a first abrasive fibrous substrate layer and a second fibrous substrate layer described above with reference to the tri-layered cleaning article (1), and using the same formulation described on Table 4. In the present tri-layered cleaning article, a first layer of a non-woven fibrous substrate material (Ahlstrom 125 GSM, LSW Substrate, thermally bonded with a further non-woven pad) and further layer of an abrasive non-woven fibrous substrate material (SAB D6-MB50B) was used in place of the respective substrate materials recited with reference to the tri-layered cleaning article (1). The tri-layered cleaning article (6) was produced using a continuous manufacturing process wherein a quantity of the first and second constituents used to form the foamed polyurethane layer were applied to the surface of a moving web of the first layer of a non-woven fibrous substrate material, and subsequently the further layer of abrasive non-woven fibrous substrate material was applied thereto in order to form the tri-layered cleaning article. Following the cessation of the foaming of the polyurethane layer, the resultant tri-layered cleaning article was subsequently cut into a hexagonal shape measuring 5 inches in maximum width, and 6 inches in maximum height, and the ultimate thickness of the flexible wiping article was approximately 2-8 millimeters, as depicted on FIGS. 3A, 3B and 3C.

The elution of the germicidal quaternary ammonium compounds in the water squeezed or wrung from tri-layered flexible wiping articles formed and described immediately above as tri-layered cleaning articles (2), (3), (4), (5), and (6) were evaluated according to the following general protocol. For the evaluation, a single sample of each aforesaid tri-layered cleaning article was used.

Testing of each sample was in accordance with the following general protocol: Each sample was first wetted by a five second contact with a flow of room temperature (approx. 20° C.) deionized water flowing form a 5 gallon laboratory dispenser. After the 5 second exposure, the sample was withdrawn and held at one edge so that the sample was oriented vertically and allowed to drain, thereafter the sample was hand-squeezed to remove at least 50% wt. of the absorbed water and the released eluted liquid was collected and subsequently analyzed for content of eluted quaternary ammonium compounds. This procedure was repeated using the same sample of the dual-layered flexible wiping articles for 100 such squeeze/wring cycles and samples of the released eluted liquid were collected from the 1st, 2nd, 10th, 20th, 30th, 40th, 50th, 60th, 70th, 80th, 90th and 100th squeeze/wring cycles.

The quantity of eluted germicidal quaternary ammonium compounds were evaluated by a standard analytical technique via titration utilizing a tetraphenylborate solution. Of course other analytical techniques may be used and are expected to provide comparable results.

The quantity of eluted germicidal quaternary ammonium compounds expressed as parts per million (ppm) are indicated on the following Table 4B which indicates the individual results following the respectively indicated squeeze/wring cycle for each tested sample.

TABLE 4B

| | eluted germicidal quaternary ammonium compounds (ppm) | | | | |
|---|---|---|---|---|---|
| squeeze/wring cycle | Tri-layered cleaning article (2) | Tri-layered cleaning article (3) | Tri-layered cleaning article (4) | Tri-layered cleaning article (5) | Tri-layered cleaning article (6) |
| 1 | 821 | 1643 | 1643 | 1529 | 1643 |
| 2 | 1784 | 1756 | 1812 | 1812 | 1756 |
| 10 | 1246 | 850 | 736 | 1246 | 1048 |
| 20 | 632 | 623 | 510 | 878 | 453 |

TABLE 4B-continued

| | eluted germicidal quaternary ammonium compounds (ppm) | | | | |
|---|---|---|---|---|---|
| squeeze/wring cycle | Tri-layered cleaning article (2) | Tri-layered cleaning article (3) | Tri-layered cleaning article (4) | Tri-layered cleaning article (5) | Tri-layered cleaning article (6) |
| 30 | 481 | 510 | 396 | 453 | 396 |
| 40 | 340 | 425 | 368 | 340 | 368 |
| 50 | 312 | 340 | 340 | 283 | 340 |
| 60 | 283 | 283 | 283 | 227 | 312 |
| 70 | 255 | 255 | 227 | 198 | 283 |
| 80 | 227 | 198 | 198 | 170 | 255 |
| 90 | 198 | 170 | 170 | 170 | 198 |
| 100 | 113 | 142 | 113 | 142 | 198 |

As can be seen from the foregoing the samples of the tri-layered flexible wiping articles provide excellent and long-lasting elution of the germicidal quaternary ammonium compounds.

While the invention is susceptible of various modifications and alternative forms, it is to be understood that specific embodiments thereof have been shown by way of example in the drawings which are not intended to limit the invention to the particular forms disclosed; on the contrary the intention is to cover all modifications, equivalents and alternatives falling within the scope and spirit of the invention as expressed in the appended claims.

The invention claimed is:

1. A cleaning article consisting of a foamed hydrophilic polyurethane composition, and at least one layer of a fibrous substrate, wherein said foamed hydrophilic polyurethane composition is formed by a process which comprises the process steps of:

providing in the process a reaction mixture consisting of one or more polyurethane prepolymer, a quaternary ammonium compound having germicidal properties according to the structural formula:

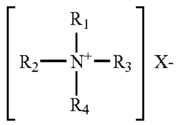

wherein $R_2$ and $R_3$ are the same or different $C_8$-$C_{12}$alkyl, or $R_2$ is $C_{12-16}$alkyl, $C_{8-18}$alkylethoxy, $C_{8-18}$alkylphenolethoxy and $R_3$ is benzyl, and X is a halide, saccharinate or methosulfate counterion, a polyethylene/polypropylene block copolymer nonionic surfactant having an avg. molecular weight of 11400, one or more further nonionic surfactants, one or more glycol ethers, one or more bulking agents based on inorganic oxides or inorganic silicates, and optionally one or more of: silicone oil, fragrance, coloring agent, organic acid, inorganic acid, zwitterionic surfactant, amphoteric surfactant, silane based coupling agent, organic solvent other than glycol ether, and rubber, and subsequently forming the foamed hydrophilic polyurethane composition, from the reaction mixture, wherein the resultant foamed polyurethane composition is characterized in that, following at least fifty (50) rinse/squeeze cycles an elution of at least about 100 parts per million of germicidal quaternary ammonium compounds in the fluid squeezed or wrung from the article.

2. A cleaning article according to claim 1 which, following at least eighty (80) rinse/squeeze cycles an elution of at least about 100 parts per million of germicidal quaternary ammonium compounds in the fluid squeezed or wrung from the foamed hydrophilic polyurethane composition of the cleaning article.

3. A cleaning article according to claim 1 wherein the at least one layer of a fibrous substrate is bonded to the foamed polyurethane composition.

4. A cleaning article according to claim 3 wherein the cleaning article consists of at least two layers of a fibrous substrate bonded to a sponge formed from the foamed polyurethane composition.

5. A cleaning article according to claim 3 which exhibits, following at least one hundred (100) rinse/squeeze cycles an elution of at least about 57 parts per million of the germicidal quaternary ammonium compounds in the fluid squeezed or wrung from the foamed hydrophilic polyurethane composition of the cleaning article.

6. A cleaning article according to claim 3, wherein the maximum thickness of the polyurethane foam layer present in a cleaning article has a maximum thickness dimension not in excess of about 10 millimeters.

7. A cleaning article according to claim 1 wherein the maximum thickness of the polyurethane foam layer present in a cleaning article has a maximum thickness dimension not in excess of about 10 millimeter.

8. A cleaning article according to claim 1 wherein the quaternary ammonium compound having germicidal properties is selected from: alkyl dimethyl benzyl ammonium chloride, octyl decyl dimethyl ammonium chloride; didecyl dimethyl ammonium chloride, dioctyl dimethyl ammonium chloride, dialkyl dimethyl ammonium chloride, diisobutyl phenoxy ethoxy ethyl dimethyl benzyl ammonium chloride, alkyl dimethyl ethylbenzyl ammonium chloride, and n-alkyl dimethyl benzyl ammonium saccharinate.

9. A foamed hydrophilic polyurethane composition formed by a process which comprises the process steps of:

providing in the process a reaction mixture consisting of one or more polyurethane prepolymer, a quaternary ammonium compound having germicidal properties according to the structural formula:

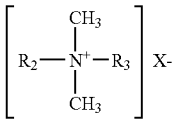

wherein $R_2$ and $R_3$ are the same or different $C_8$-$C_{12}$alkyl, or $R_2$ is $C_{12-16}$alkyl, $C_{8-18}$alkylethoxy, $C_{8-18}$alkylphenolethoxy and $R_3$ is benzyl, and X is a halide, saccharinate or methosulfate counterion, a polyethylene/polypropylene block copolymer nonionic surfactant having an avg. molecular weight of 11400, one or more further nonionic surfactants, one or more glycol ethers, one or more bulking agents based on inorganic oxides or inorganic silicates, and optionally one or more of: silicone oil, fragrance, coloring agent, organic acid, inorganic acid, zwitterionic surfactant, amphoteric surfactant, silane based coupling agent, organic solvent other than glycol ether, and rubber, and subsequently forming the foamed hydrophilic polyurethane composition, wherein the resultant foamed polyurethane composition is characterized in that: following twenty (20) rinse/squeeze cycles of the foamed polyurethane composition, the foamed polyurethane composition provides an elution of at least about 340 parts per million of germicidal quaternary ammonium compounds in the fluid squeezed or wrung from the foamed polyurethane composition, and, following forty (40) rinse/squeeze cycles of the foamed polyurethane composition, the foamed polyurethane composition provides an elution of at least about 340 parts per million of germicidal quaternary ammonium compounds in the fluid squeezed or wrung from the foamed polyurethane composition, and, following fifty (50) rinse/squeeze cycles of the foamed polyurethane composition, the foamed polyurethane composition provides an elution of at least about 252 parts per million of germicidal quaternary ammonium compounds in the fluid squeezed or wrung from the foamed polyurethane composition.

10. A foamed hydrophilic polyurethane composition formed by the process according to claim 9, wherein the process includes the further step of:

bonding a fibrous substrate to the foamed polyurethane composition.

11. A foamed hydrophilic polyurethane composition formed by the process according to claim 9, wherein the quaternary ammonium compound having germicidal properties is selected from: alkyl dimethyl benzyl ammonium chloride, octyl decyl dimethyl ammonium chloride; didecyl dimethyl ammonium chloride, dioctyl dimethyl ammonium chloride, dialkyl dimethyl ammonium chloride, diisobutyl phenoxy ethoxy ethyl dimethyl benzyl ammonium chloride, alkyl dimethyl ethylbenzyl ammonium chloride, and n-alkyl dimethyl benzyl ammonium saccharinate.

12. A process for cleaning or sanitizing a surface in need of treatment which process comprises the steps of:

providing a cleaning article according to claim 1, and, contacting the said surface with the said cleaning article and thereby providing a cleaning or sanitizing effect thereto.

13. A process for cleaning or sanitizing a surface in need of treatment which process comprises the steps of:

providing a cleaning article according to claim 4, and, contacting the said surface with the said cleaning article so to provide a cleaning or sanitizing effect thereto.

14. A process for cleaning or sanitizing a surface in need of treatment which process comprises the steps of:

providing a foamed hydrophilic polyurethane composition according to claim 9, and, contacting the said surface with the said composition so to provide a cleaning or sanitizing effect thereto.

* * * * *